United States Patent
Miwa et al.

(10) Patent No.: US 9,747,138 B2
(45) Date of Patent: Aug. 29, 2017

(54) INFORMATION PROCESSING DEVICE AND METHOD

(71) Applicant: FUJITSU LIMITED, Kawasaki-shi, Kanagawa (JP)

(72) Inventors: Yuta Miwa, Kawasaki (JP); Hironori Nishino, Kawasaki (JP); Makoto Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 14/741,804

(22) Filed: Jun. 17, 2015

(65) Prior Publication Data

US 2015/0370604 A1 Dec. 24, 2015

(30) Foreign Application Priority Data

Jun. 19, 2014 (JP) ................................ 2014-126091
Jun. 5, 2015 (JP) ................................ 2015-115142

(51) Int. Cl.
  *G06F 9/46* (2006.01)
  *G06F 9/50* (2006.01)

(52) U.S. Cl.
  CPC .... *G06F 9/5083* (2013.01); *G06F 2209/5022* (2013.01)

(58) Field of Classification Search
  None
  See application file for complete search history.

(56) References Cited

U.S. PATENT DOCUMENTS

| 2011/0145461 A1* | 6/2011 | Zhao ..................... G06F 9/4812 710/267 |
| 2014/0321462 A1* | 10/2014 | Kancherla ............... H04L 45/72 370/389 |
| 2015/0355700 A1* | 12/2015 | Pusukuri ............... G06F 1/3228 713/323 |

FOREIGN PATENT DOCUMENTS

| JP | 11-85771 | 3/1999 |
| JP | 2003-163687 | 6/2003 |
| JP | 2004-64619 | 2/2004 |
| JP | 2009-218988 | 9/2009 |

\* cited by examiner

*Primary Examiner* — Sisley Kim
(74) *Attorney, Agent, or Firm* — Staas & Halsey LLP

(57) ABSTRACT

An information processing device comprising a processor that selects, from among a plurality of data processing section that subject data blocks to a predetermined process, a data processing section to which a first data block group with first identification information based on the data blocks is allocated, and divides, when a workload placed on the data processing section exceeds a first threshold, the first data block group allocated to the data processing section into a plurality of second data block groups with second identification information based on the data blocks, and selects, from among the plurality of data processing sections, data processing sections to which the plurality of second data block groups are allocated.

9 Claims, 23 Drawing Sheets

FIG. 6

ALLOCATION TABLE

| N-DIGIT HASH VALUE | ALLOCATION DESTINATION PROCESSING CORE | NUMBER OF FLOWS | AGGREGATION THRESHOLD |
|---|---|---|---|
| 0b00000000 | #1 | 300 | |
| .. | .. | .. | |
| 0b11111111 | #2 | 100 | |

EXTENDED ALLOCATION TABLE

| M-DIGIT HASH VALUE | ALLOCATION DESTINATION PROCESSING CORE | NUMBER OF FLOWS | AGGREGATION THRESHOLD |
|---|---|---|---|
| 0b000000110000 | #3 | 200 | |
| .. | .. | .. | |
| 0b000000111111 | — | — | |

$2^{M-N}$

| COMPLETE HASH VALUE MANAGEMENT TABLE | |
|---|---|
| COMPLETE HASH VALUE | NUMBER OF FLOWS |
| 0b000000000000001011 | 100 |

DATA TO BE ADDED IN RESPONSE TO GENERATION OF NEW FLOW

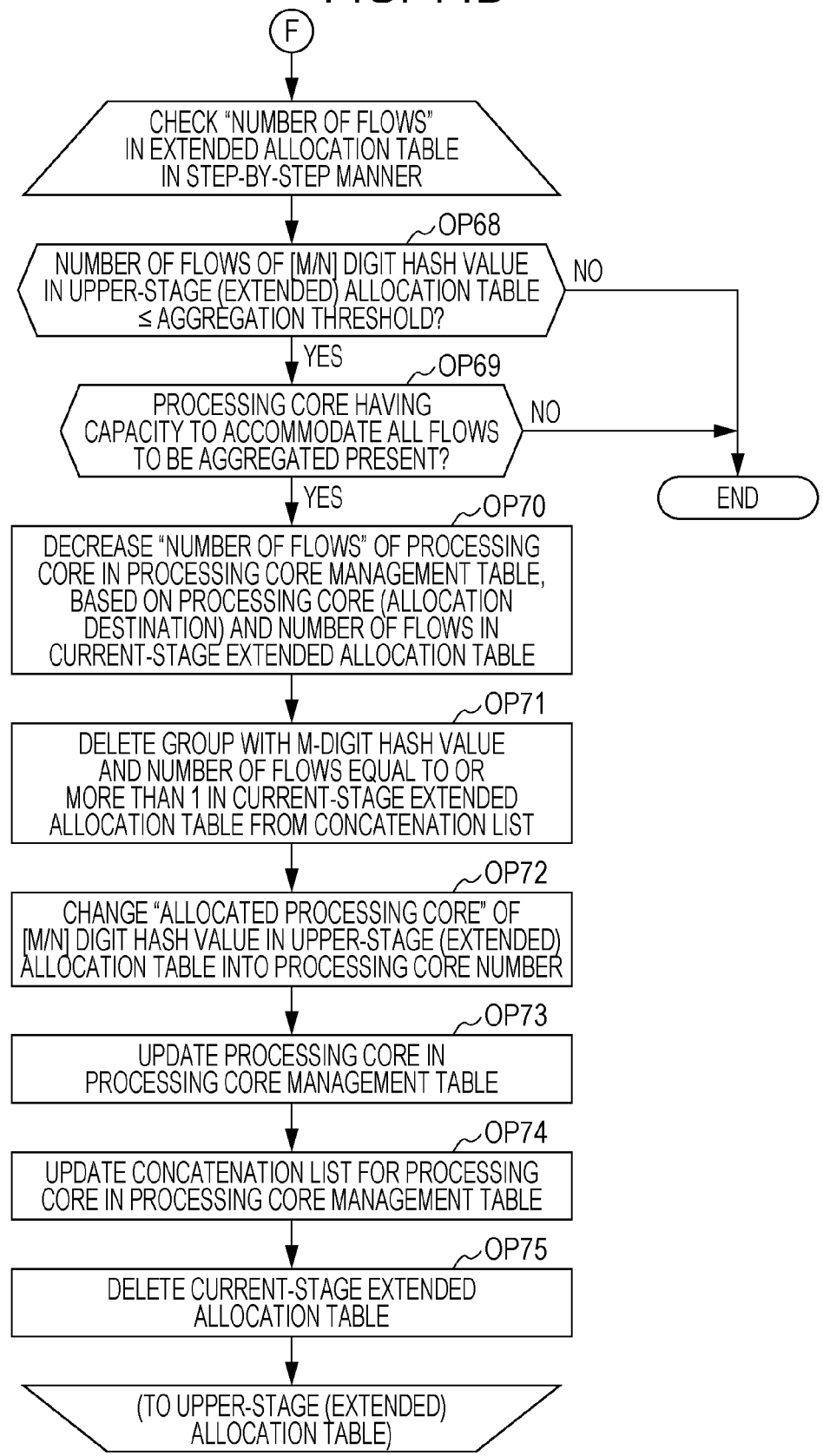

INFORMATION PROCESSING DEVICE AND METHOD

CROSS-REFERENCE TO RELATED APPLICATION

This application is based upon and claims the benefit of priority of the prior Japanese Patent Application No. 2014-126091, filed on Jun. 19, 2014, and the prior Japanese Patent Application No. 2015-115142, filed on Jun. 5, 2015, the entire contents of which are incorporated herein by reference.

FIELD

The embodiments discussed herein are related to information processing devices that distribute processes, and methods of distributing processes.

BACKGROUND

When multiple pieces of multimedia information, including audio and video packets, are handled over a network, in some cases, they are distributed in flow units among a plurality of processing devices and individually processed thereby in order to reduce network delays. For that purpose, the following two exemplary techniques are employed.

In the first technique disclosed in Japanese Laid-open Patent Publication No. 2003-163687, input packets are classified into some groups, based on their hash values; the hash values are acquired from, for example, the destination addresses, source addresses, source port numbers, and destination port numbers of the input packets. Then, the flows of the groups are output to different routes. In this case, the weight coefficients of the groups are adjusted in accordance with their in-use bandwidths. The range of the hash values is divided such that the proportion of the divisional ranges coincides with that of their weight coefficients, and the hash values are related to the groups. This makes it possible to distribute traffic among the routes optimally and dynamically.

In the second technique disclosed in Japanese Laid-open Patent Publication No. 2009-218988, the multicast groups to which clients are allocated are calculated using specific bits of hash values; the hash values are set based on the IP addresses of the clients.

Problems with the above techniques will be described below. In the first technique, if a large number of input packets are present in the same group and its flow volume exceeds the allowable processing capacity of the route, no mechanism to select an alternative route is prepared.

In the second technique, if the number of clients pertaining to the same group increases, this group is divided. Here, the number of groups created is dependent on a bit count of a hash value, and tables are prepared in relation to multiple bit counts. Groups are created based on these tables. Assuming that input packets are first classified using two bits (into four groups) and then they are classified using three bits (into eight groups), the table for two bits is replaced by the table for three bits. So, when one or more of the groups are divided, the system re-arranges all the groups by, for example, rewriting the data of the groups in the memory.

In order to avoid overtaking of packets or an occurrence of exclusive lock upon access to a shared memory, a flow is preferably processed by the same processing device. When data is rewritten into a memory in order to re-arrange groups, however, processing devices for all flows are updated during the communication. In this case, different processing devices may process the same flow before and after the re-arrangement of the groups. This would cause a packet loss or delay during the communication of flows. Thus, in this technique, the re-arrangement of groups is prone to affect the overall system.

An embodiment discussed herein aims to provide an information processing device and an information processing method which is used in a system that distributes processes among a plurality of processing devices and which are capable of suppressing the processes easily and securely from being concentrated in a specific processing device.

SUMMARY

According to an aspect of the invention, an information processing device comprises a processor that selects, from among a plurality of data processing sections that subject data blocks to a predetermined process, a data processing section to which a first data block group with first identification information based on the data blocks is allocated, and divides, when a workload placed on the data processing section exceeds a first threshold, the first data block group allocated to the data processing section into a plurality of second data block groups with second identification information based on the data blocks, and selects, from among the plurality of data processing sections, data processing sections to which the plurality of second data block groups are allocated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an exemplary allocation table;

FIG. 7 illustrates an exemplary extended allocation table;

FIG. 14D is an exemplary flowchart of the process of deleting a flow which the allocation control core performs;

DESCRIPTION OF EMBODIMENTS

Some embodiments will be described below with reference to the accompanying drawings. Note that configurations that will be described below are non-limiting examples.

First Embodiment

Figure 1:
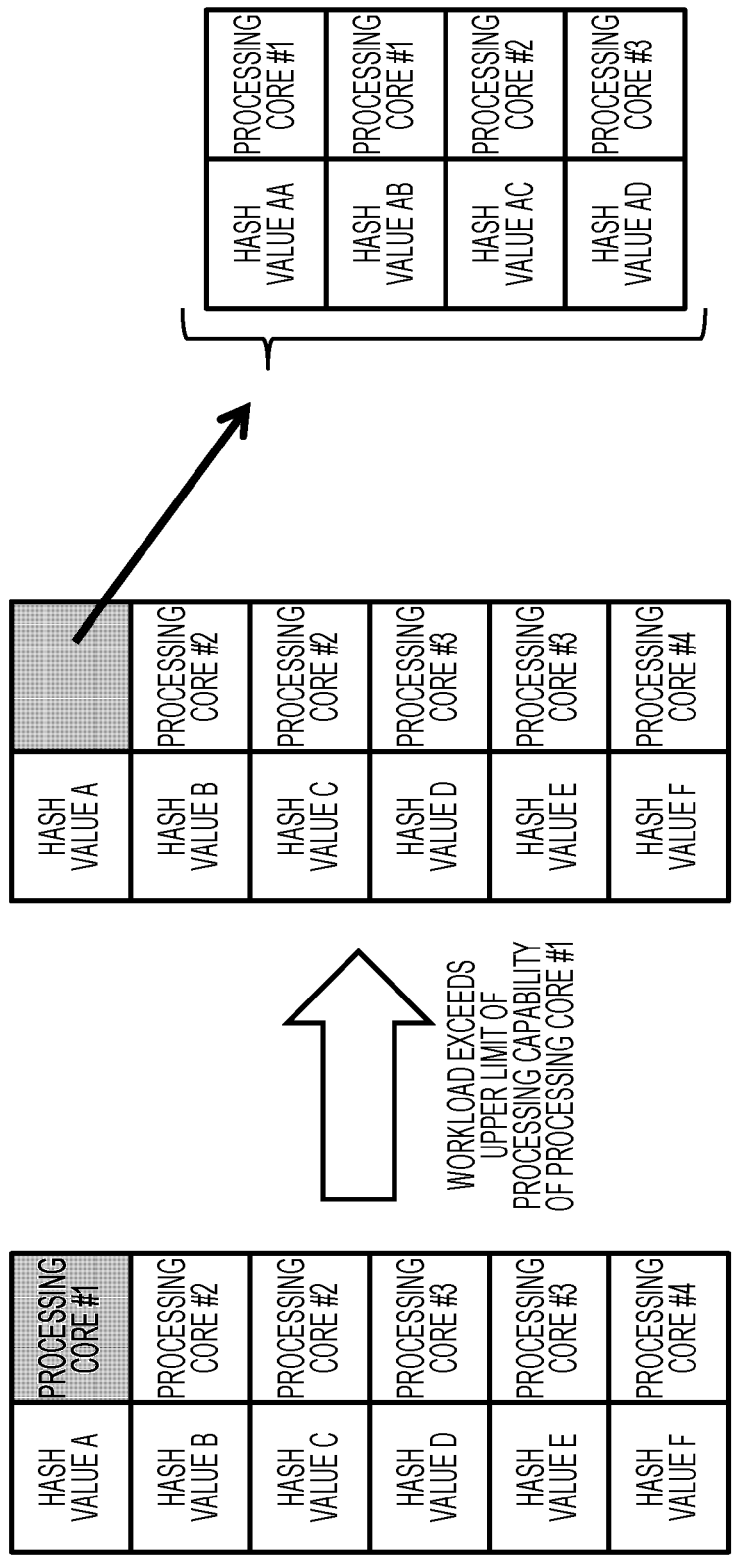
FIG. 1 illustrates an exemplary allocation of processes in a first embodiment.

FIG. 1 illustrates an exemplary allocation of processes in a first embodiment. An information processing device in the first embodiment is equipped with a central processing unit (CPU) having a plurality of processing cores; each processing core processes data blocks. This information processing device classifies data blocks into some groups, based on the attributes of the data blocks, more specifically, based on hash values calculated from information contained in the control data blocks preceding the data blocks. Then, the information processing device determines to which processing core each of the groups is to be allocated. For example, each data block is classified based on the upper N-digit number of its binary hash value (N is a positive integer; N<the number of all the digits of the hash value).

Suppose a workload placed on a processing core #1 in FIG. 1 to which a group has been allocated exceeds the limit of its processing capability. Here, in the group allocated to the processing core #1, an upper N-digit number of the hash value (referred to below as an upper N-digit hash value) is denoted by A. The information processing device divides this group into some sub-groups, based on the upper M-digit number of the hash value (referred to below as an upper M-digit hash value) (M is a positive integer; N<M≤the number of all the digits of the hash value"). Then, the information processing device allocates these sub-groups with upper M-digit hash values "AA", "AB", "AC", and "AD" to the processing cores #1, #1, #2, and #3, respectively.

In this way, if the workload placed on the processing core #1 to which the group with the upper N-digit hash value A has been allocated exceeds the limit of its processing capability, the processing for this group is shared by the processing cores #1 to #3. In this case, none of the other groups is divided. Therefore, the processing for these groups is performed without the flows being updated and communication being interrupted. Thus, dividing the group with the upper N-digit hash value A does not affect the overall system. In addition, the dividing of the group does not involve, for example, the re-calculation of hash values, so it is achieved with simple processing. Herein, the upper N-digit hash value is an example of "first identification information"; the upper M-digit hash value is an example of "second identification information". Alternatively, the (M−N) digit number of a hash value may be another example of the second identification information.

System Configuration

Figure 2:
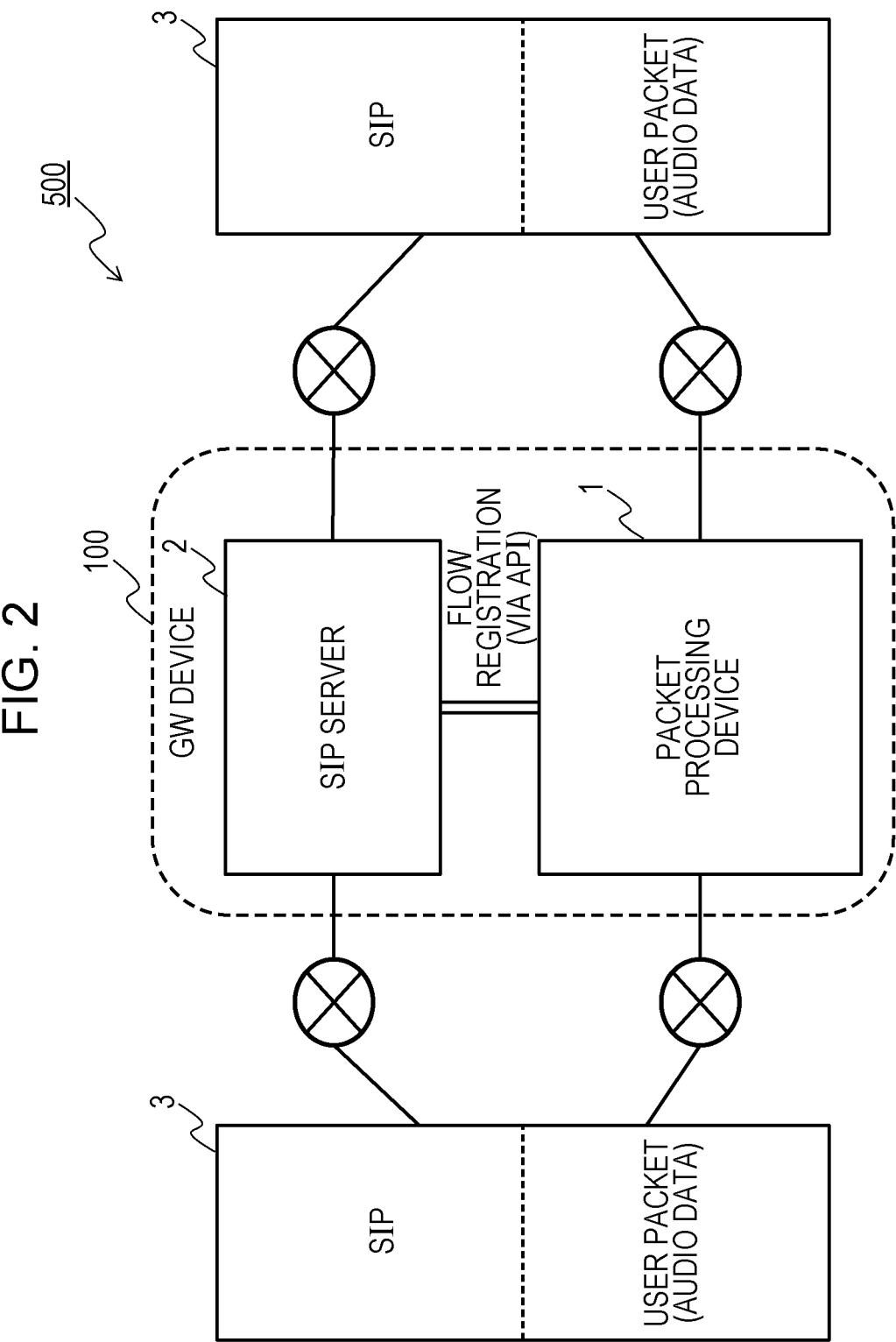
FIG. 2 illustrates an exemplary configuration of a distributed processing system in the first embodiment.

FIG. 2 illustrates an exemplary configuration of a distributed processing system 500 in the first embodiment. The system in the first embodiment is assumed to conform to a voice over internet protocol (IP) (VoIP), voice over long term evolution (LTE) (VoLTE), or some other audio-packet-related scheme. This distributed processing system 500 includes a gateway device 100, and a plurality of audio terminals 3.

The gateway device 100 is an exemplary device over a carrier network. The gateway device 100 includes a packet processing device 1 and a session initiation protocol (SIP) server 2. Each of the packet processing device 1 and the SIP server 2 may be embodied by a unit card to be inserted into the casing of the gateway device 100. The SIP server 2 and the packet processing device 1 process session control packets and audio packets, respectively, between the audio terminals 3.

In the process of the VoIP, control packets (non-audio packets) are first exchanged between the SIP server 2 and each audio terminal 3 in order to prepare communication. Then, after the completion of the preparation for the communication between the audio terminals 3, the packet processing device 1 begins to relay user packets (audio packets) whereby the communication starts. This enables the SIP server 2 to acquire flow information on an audio packet before the audio packet is transmitted to the packet processing device 1. Therefore, before an audio packet reaches the packet processing device 1, the SIP server 2 registers the flow information on the audio packet with the packet processing device 1 via an application programming interface (API). Herein, the SIP server 2 is an example of a controller.

The packet processing device 1 is equipped with a CPU having a plurality of processing cores. When the SIP server 2 registers a flow with the packet processing device 1 via the API, the packet processing device 1 calculates the hash value of this flow and determines to which processing core the flow is to be allocated, based on the calculated hash value. When audio packets of this flow reach the packet processing device 1, the packet processing device 1 allocates these packets to the determined processing core. Then, the audio packets are subjected to a predetermined process and output from the gateway device 100.

Device Configuration

Figure 3:
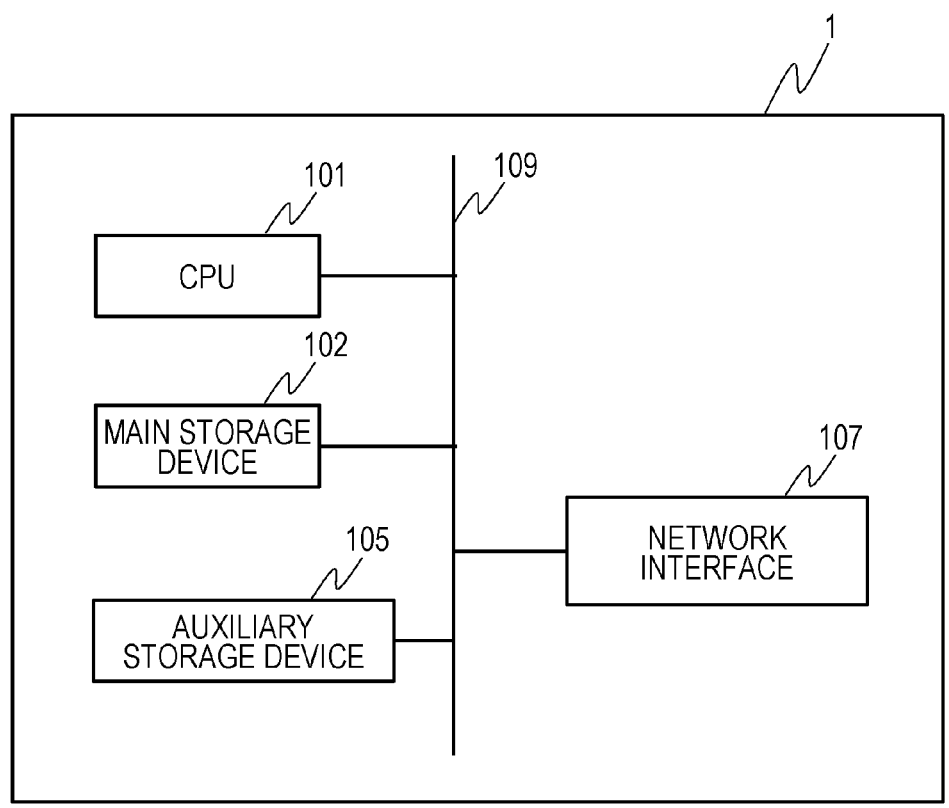
FIG. 3 illustrates an exemplary hardware configuration of a packet processing device.

FIG. 3 illustrates an exemplary hardware configuration of the packet processing device 1. The packet processing device 1 includes a central processing unit (CPU) 101, a main storage device 102, an auxiliary storage device 105, and a network interface 107. These constituent elements are electrically interconnected via a bus 109.

The main storage device 102 includes a random access memory (RAM) and a read only memory (ROM). The RAM may be a dynamic RAM (DRAM), a static RAM (SRAM), a synchronous DRAM (SDRAM), or some other similar semiconductor memory. The ROM retains an operating system (OS), a flow allocation determination program, a packet allocation program, and other various programs.

The flow allocation determination program is used to determine to which processing core a flow is to be allocated. The packet allocation program is used to allocate a packet to the processing core to which the flow of this packet has been allocated.

For example, the RAM in the main storage device 102 provides the CPU 101 with a region in which the programs are loaded from the ROM and a workspace or is used as a buffer.

For example, data that the CPU 101 will use in order to execute the programs is stored in the auxiliary storage device 105. The auxiliary storage device 105 may be embodied by a nonvolatile recording medium such as an erasable programmable ROM (EPROM) or a hard disk drive. The programs that would be stored in the ROM within the main storage device 102 may be stored in the auxiliary storage device 105 instead.

The CPU 101 performs various processes by loading into the RAM and executing the OS and the programs retained in the ROM within the main storage device 102. The CPU 101 has various cores.

The network interface 107 may be embodied by a circuit with ports to which network cables such as optical or local area network (LAN) cables are to be connected. Although the packet processing device 1 has a plurality of network interfaces 107, only one of the network interfaces 107 is illustrated in FIG. 3 for simplicity. To give an example, the packet processing device 1 is connected to a carrier network via a circuit with ports serving as the network interface 107, to which optical cables are connected. To give another example, the packet processing device 1 is connected to a LAN via a network interface card (NIC) serving as the network interface 107, and communicates with the SIP server 2.

The hardware configuration of the packet processing device 1 as illustrated in FIG. 3 is a non-limiting example; one or more of the constituent elements may be removed or replaced or other constituent elements may be added as appropriate in accordance with an embodiment. To give an example, the packet processing device 1 does not necessarily have to be equipped with the auxiliary storage device 105. To give another example, the packet processing device 1 is equipped with a portable recording medium drive and handles a portable recording medium, such as an SD card, as one of the auxiliary storage devices.

The hardware configuration of the SIP server 2 is substantially the same as that of the packet processing device 1. More specifically, the SIP server 2 includes a CPU, a main storage device, an auxiliary storage device, and a network interface. These hardware constituent elements are substantially the same as those in the packet processing devices 1 and will not be described.

Figure 4:
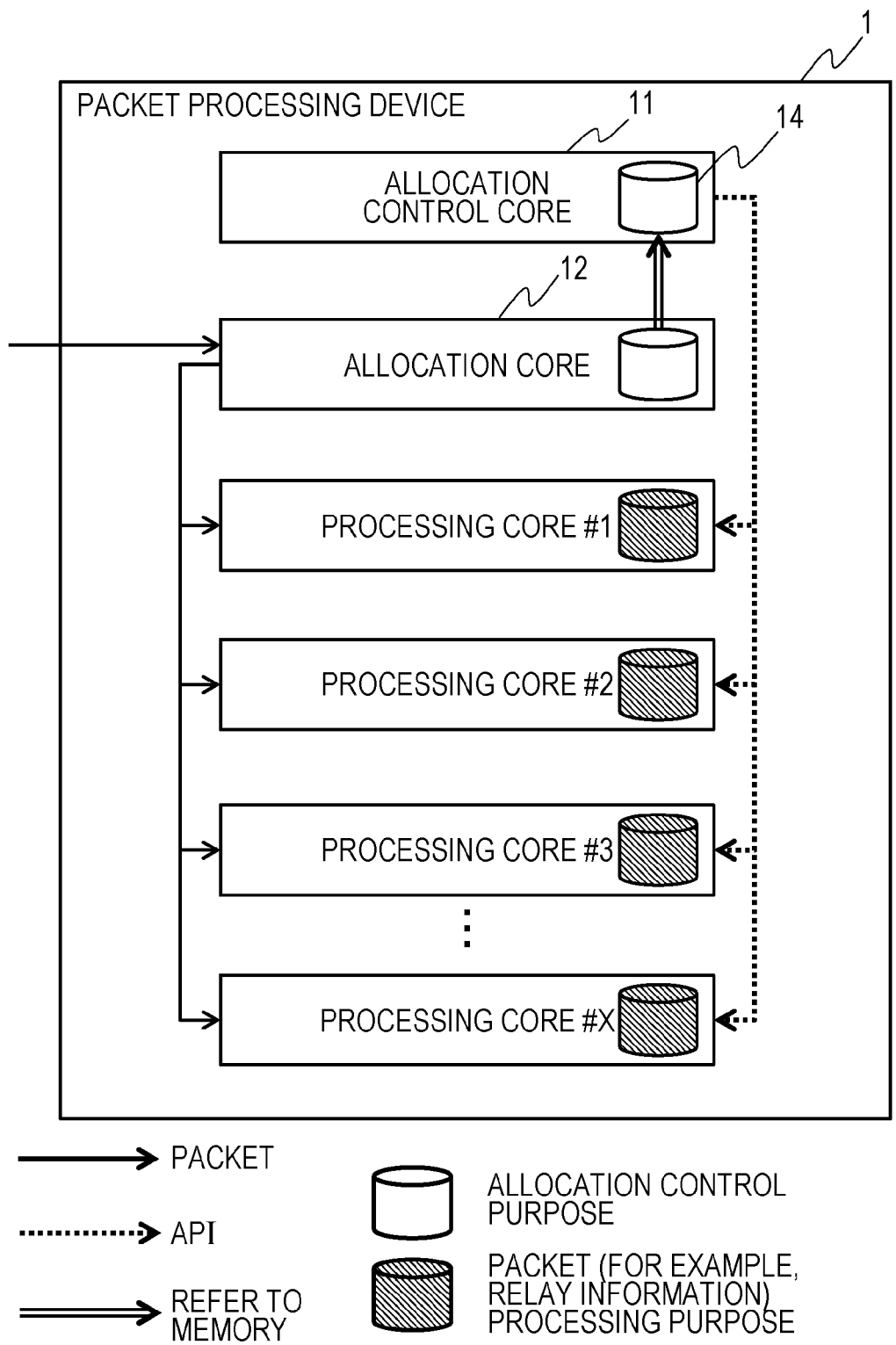
FIG. 4 is an exemplary functional configuration of the packet processing device in the first embodiment.

FIG. 4 illustrates an exemplary functional configuration of the packet processing device 1 in the first embodiment. Constituent elements of the packet processing device 1 are an allocation control core 11, an allocation core 12, and processing cores #1 to #X (X: positive integer).

The allocation control core 11 is one of a plurality of cores owned by the CPU 101 and executes the flow allocation determination program, determining to which processing core a flow is to be allocated.

The allocation core 12 is another one of the cores belonging to the CPU 101, and executes the packet allocation program, allocating user packets to the processing cores determined to be allocation destinations by the allocation control core 11. Herein, the allocation core 12 is an example of an "allocation section".

The processing cores #1 to #X are the remaining ones of the cores belonging to the CPU 101, and execute programs related to packet processing and process the user packets. Examples of packet processing performed by each processing core include packet transfer, network address translation (NAT), and bandwidth control. Herein, each processing core is an example of a "data processing section".

Figure 5:
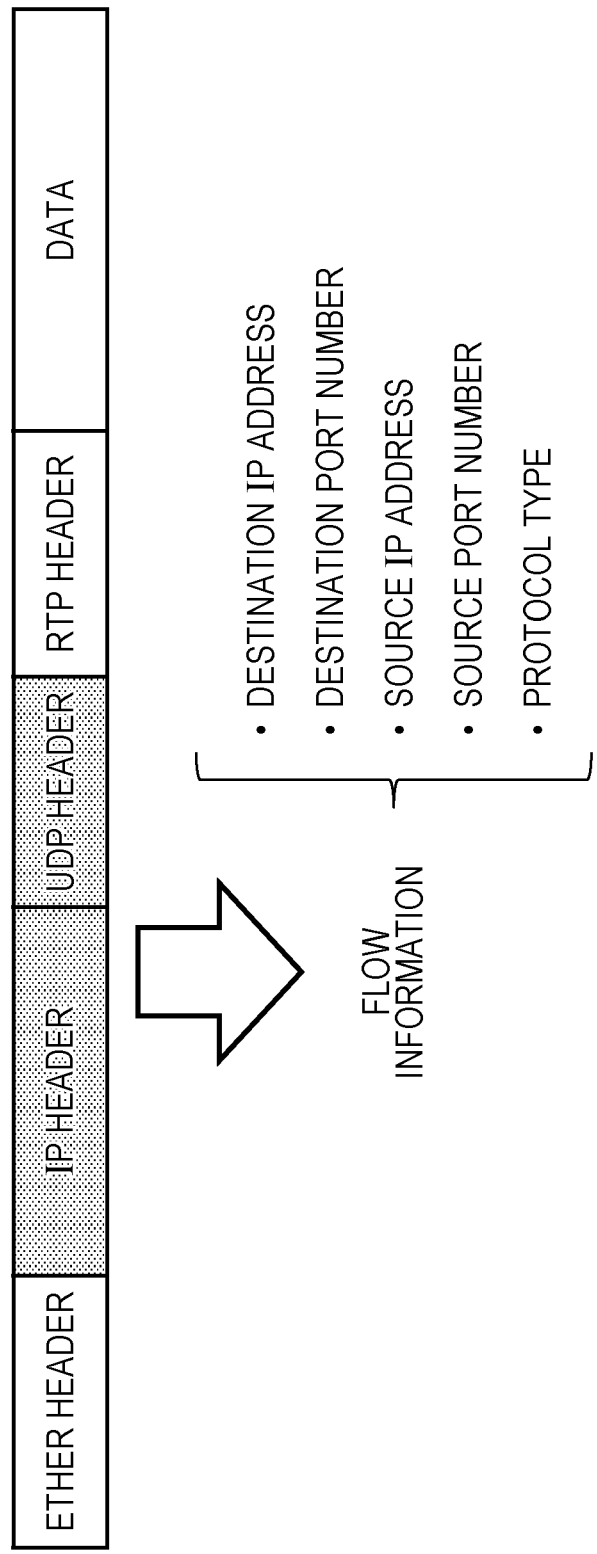
FIG. 5 illustrates an exemplary configuration of a packet.

FIG. 5 illustrates an exemplary configuration of a packet. Since the system in the first embodiment is assumed to handle audio packets, a packet conforming to a user datagram protocol (UDP) and a real-time transport protocol (RTP) is illustrated in FIG. 5. Herein, a packet is an example of a "data block".

The SIP server 2 acquires flow information from a control packet; exemplary flow information contains: a destination IP address, a source IP address, and a protocol type in an IP header, and a destination port number and a source port number in a UDP header. The SIP server 2 passes the flow information to the packet processing device 1 via the API. Passing flow information from the SIP server 2 to the packet processing device 1 is referred to below as flow registration.

In the first embodiment, the term "flow" is defined as a group of packets with the same destination IP address, source IP address, protocol type, destination port number, and source port number. There is, however, no limitation on the definition of the flow.

When the allocation control core 11 in the packet processing device 1 receives the flow information from the SIP server 2, it calculates the hash value from the destination IP address, the source IP address, the protocol type, the destination port number, and the source port number that are all contained in the flow information. The hash value may be calculated through exclusive OR or a division using prime numbers. In addition, the hash value may be calculated as a binary number sequence in the range of 4 to 32 digits. The allocation control core 11 determines to which processing core the flow is to be allocated, based on an upper N-digit hash value A. In this case, flows with the same upper N-digit hash value A are classified into the same group.

An upper limit is put on the number of flows that each of the processing cores #1 to #X is permitted to process. Herein, the number of flows permitted to be processed is referred to as the upper limit number of flows. If the number of flows to be processed by a processing core exceeds the upper limit number of flows, the allocation control core 11 divides one of groups in the flow allocated to this processing core into some sub-groups, based on an upper M-digit hash value (N<M). Then, the allocation control core 11 determines to which processing core each of the sub-groups with the same upper M-digit hash value are to be allocated. Herein, the allocation control core 11 is an example of an "information processing device".

The allocation control core 11 has a database 14; the database 14 may be created in a storage area of the RAM in the main storage device 102. The database 104 retains an allocation table, an extended allocation table, a processing core management table, and a complete hash value management table.

FIG. 6 illustrates an exemplary allocation table. The allocation table retains processing cores to which the groups of the flows with the same upper N-digit hash value have been allocated. The entries of the allocation table include an N-digit hash value, an allocation destination processing core, the number of flows, and an aggregation threshold.

The entry "N-digit hash value" stores the upper N-digit hash values. For the allocation table, $2^N$ entries are initially prepared. The entry "N-digit hash value" initially stores all the possible values of N-digit binary numbers. In this entry, these values are listed in increasing order of upper N-digit hash value.

The entry "allocation destination processing core" stores the pieces of information on allocation destinations and is initially null. When the flow of a group is registered with the entry "N-digit hash value", the identification number of the processing core to which this group has been allocated is stored in the entry "allocation destination processing core". In order to select one from processing cores in each of which the number of processes does not reach the upper limit number of flows, a round robin method may be used. If a group in the entry "N-digit hash value" is classified into sub-groups, a pointer to the extended allocation table, which stores the processing cores to which these sub-groups have been allocated, is stored in the entry "allocation destination processing core". Details of the extended allocation table will be described later. A pointer to the extended allocation table may be the address at which the extended allocation table is stored.

The entry "number of flows" stores the number of corresponding flows in the entry "N-digit hash value". The entry "number of flows" is initially null. When the flow with the upper N-digit hash value is registered in the entry "N-digit hash value", the entries "allocation destination processing core" and "number of flows" are updated by the allocation control core 11.

When a group that has been created based on an upper N-digit hash value is divided into sub-groups, based on an upper M-digit hash value, an "aggregation threshold" is used to determine whether to aggregate these sub-groups. The entry "aggregation threshold" stores the number of flows for use as a threshold. If the registered number of flows of a group with an upper N-digit hash value becomes less than the number of flows in the entry "aggregation threshold", the sub-groups in this group are aggregated.

When a group with an upper N-digit hash value is divided into sub-groups, the allocation control core 11 registers a value with the entry "aggregation threshold". When the sub-groups are aggregated, the allocation control core 11 deletes this value from the entry "aggregation threshold". A value in the entry "aggregation threshold" may be unique to the system or dependent on flow type.

The allocation table illustrated in FIG. 6 is a non-limiting example. For example, the allocation table is initially null, and a new entry is added to the allocation table every time a flow with a new upper N-digit hash value is registered with it. Herein, the allocation table is an example of a first storage section. The group of flows with an upper N-digit hash value is an example of a "first data block group".

When the allocation core 12 allocates a user packet, it calculates the hash value from this user packet. Then, the allocation core 12 refers to the entry "allocation destination processing core" of the allocation table in the database 14 within the allocation control core 11, and acquires a value from the entry "allocation destination processing core" which is related to the upper N-digit number (upper N-digit hash value) of the calculated hash value. If the value acquired from the entry "allocation destination processing core" matches one of the identification numbers of the processing cores, the allocation core 12 allocates the user packet to the processing core with this identification number. If the value acquired from the entry "allocation destination processing core" represents a pointer to an extended allocation table, the allocation core 12 refers to the extended allocation table indicated by this pointer. If the value acquired from the entry "allocation destination processing core" is null, the allocation core 12 discards the user packet. A packet in a flow that is not registered by the SIP server 2 has no pass.

FIG. 7 illustrates an exemplary extended allocation table. When a group with an upper N-digit hash value is divided into some sub-groups, an extended allocation table is created for this group. Specifically, this extended allocation table retains the allocation destinations of the sub-groups. The extended allocation table has entries "M-digit hash value", "allocation destination processing core", "number of flows", and "aggregation threshold".

The entry "M-digit hash value" stores upper M-digit hash values in a binary format. The upper N-digit number of the values stored in the entry "M-digit hash value" is identical to the upper N-digit hash value of the sub-groups. The memory capacity for $2^{(M-N)}$ entries is initially reserved in the extended allocation table. Of the hash values stored in the entry "M-digit hash value" of the extended allocation table, the upper N-digit numbers are identical to one another but the upper N+1 to M-digit numbers are different.

The description of the entries "allocation destination processing core", "number of flows", and "aggregation threshold" in the allocation table are also applied to those in the extended allocation table. Therefore, these entries will not be described. Although an allocation table is present for a single packet processing device 1, extended allocation tables are present for respective sub-groups. There are cases where a sub-group created based on an upper M-digit hash value is further divided. In such a case, a pointer to an extended allocation table having an entry "upper L-digit hash value (M<L)" is stored in the entry "allocation destination processing core" of the extended allocation table. Herein, the extended allocation table is an example of a second storage section; a group of flows with the same upper M-digit value is an example of a second data block group.

If a value in the entry "allocation destination processing core" of the allocation table which corresponds to the upper N-digit hash value of a user packet represents a pointer to an extended allocation table, the allocation core 12 refers to this extended allocation table. Then, the allocation core 12 acquires a value from the entry "allocation destination processing core" of the extended allocation table which corresponds to the upper M-digit hash value A of the user packet. If the value acquired from the entry "allocation destination processing core" matches one of the identification numbers of the processing cores, the allocation core 12 allocates the user packet to this processing core. If the value acquired from the entry "allocation destination processing core" represents a pointer to an extended allocation table, the allocation core 12 refers to this extended allocation table.

Figure 8:
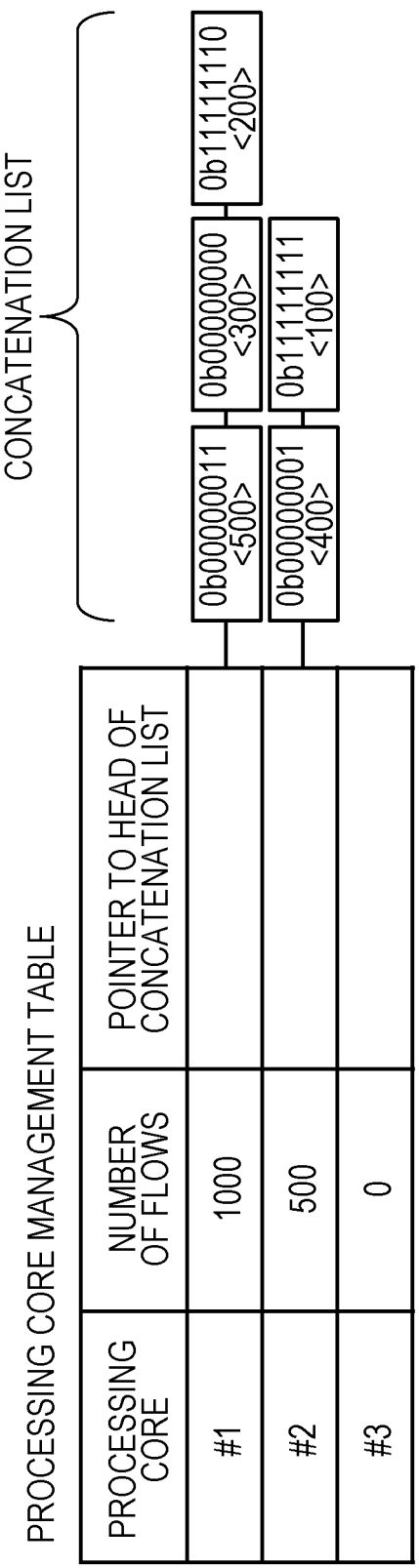
FIG. 8 illustrates an exemplary processing core management table.

FIG. 8 illustrates an exemplary processing core management table. The processing core management table is used to manage the number of flows which is assigned to each processing core. The processing core management table is stored in the database of the allocation control core 11. The processing core management table is prepared for a single packet processing device 1.

The processing core management table contains entries "processing core", "number of flows", and "pointer to head of concatenation list". The entry "processing core" stores the identification numbers of cores that operate as processing cores. The entry "number of flows" stores the number of flows which is assigned to each processing core in the entry "processing core".

The entry "pointer to head of concatenation list" stores the addresses of the first groups in concatenation lists. Each concatenation list stores the hash values of flow groups allocated to a corresponding processing core in the entry "processing core". Each concatenation list contains identification information on groups (upper X-digit hash value) and the number of flows for each group. In each concatenation list, for example, groups are listed in decreasing order of the number of flows. Note that the configuration of the processing core management table in FIG. 8 is a non-limiting example.

Figure 9:
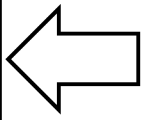
FIG. 9 illustrates an exemplary complete hash value management table.

FIG. 9 illustrates an exemplary complete hash value management table. The complete hash value management table manages the complete hash values that the packet processing device 1 will handle for actual processing and the number of flows for each complete hash value. The complete hash value management table is used to refer to the upper (N+1 and more)-digit number of the hash value of the group when a group is divided into sub-groups. The complete hash value management table has entries "complete hash value" and "number of flows".

The entry "complete hash value" stores the complete hash values of flows that the packet processing device 1 handles for processing. The entry "number of flows" stores the number of flows with each of the complete hash values stored in the entry "complete hash value".

The complete hash value management table is initially null. When the packet processing device 1 receives a flow with a new hash value from the SIP server 2, the allocation control core 11 adds this flow as a new entry. When the number of flows with a certain hash value becomes 0 in the complete hash value management table, the allocation control core 11 deletes this entry.

Exemplary Method of Dividing Group

Figure 10:
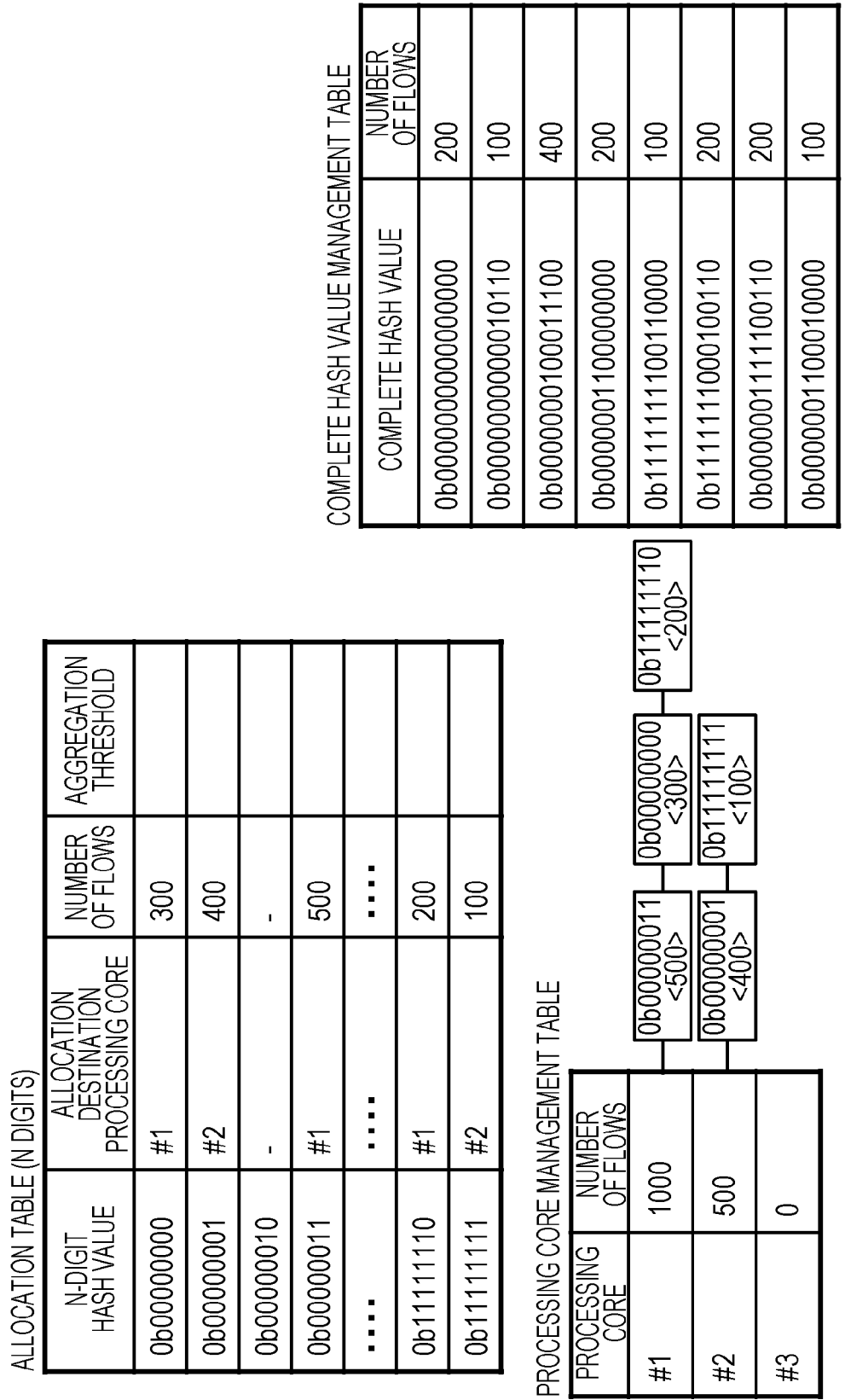
FIG. 10 illustrates an exemplary configuration of the tables when no groups are divided.

FIG. 10 illustrates an exemplary configuration of the tables when no groups are divided. In the example illustrated in FIG. 10, the packet processing device 1 is assumed to have processing cores #1, #2, and #3. The upper limit number of flows that each of the processing cores #1, #2, and #3 is permitted to process is set to 1000. This upper limit number is already defined in the packet processing device 1 and recognized by each processing core. Furthermore, an N-digit value is assumed to be an 8-digit value in FIG. 10.

As indicated by the allocation table of FIG. 10, respective groups with upper N-digit hash values "0b00000000", "0b00000011", and "0b11111110" are allocated to the processing core #1. The head "0b" of each hash value indicates that a binary number follows it. In addition, the processing core management table indicates that the total number of flows allocated to the processing core #1 is 1000 which is equal to its upper limit number of flows. Thus, the processing core #1 is not permitted to process any more flows. As in the example illustrated in FIG. 10, when the registered number of flows which is assigned to a processing core reaches its upper limit, one or more of the groups are divided.

Figure 11:
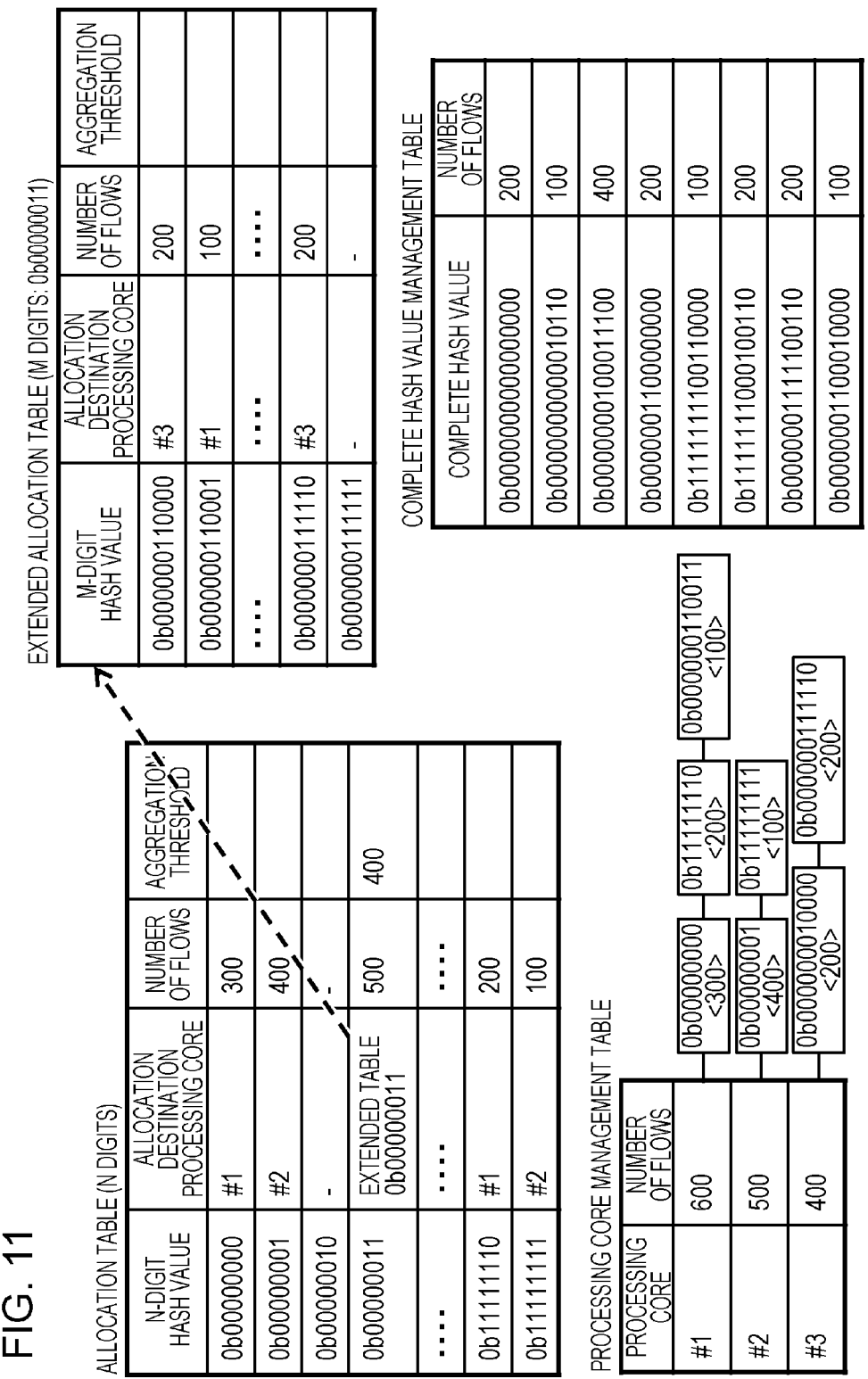
FIG. 11 illustrates an exemplary configuration of the tables when a group is divided.

FIG. 11 illustrates an exemplary configuration of the tables when a group is divided. In the example illustrated in FIG. 11, a group allocated to the processing core #1 illustrated in FIG. 10 is divided into sub-groups.

From among the groups allocated to the processing core #1, one having the largest number of flows may be selected as a group to be divided. In the example of FIG. 11, the number of flows for the group with the upper N-digit hash value "0b00000011" is 500, which is the largest among the groups allocated to the processing core #1. Thus, this group will be divided.

In the example of FIG. 11, the extended allocation table for the upper N-digit hash value "0b00000011" is illustrated. In this example, an M-digit value is assumed to be a 12-digit value. As indicated by the complete hash value management table, the group of the flows with the upper M-digit value "0b00000011" is constituted of sub-groups with the hash values of "0b000000110000", "0b000000110001", and "0b000000111110". Furthermore, the numbers of flows therefor are 200, 100, and 200.

For example, the sub-groups with the upper M-digit hash value resulting from division are allocated preferentially to processing cores for each of which the registered number of flows does not reach its upper limit. Consequently, the sub-groups with the upper M-digit hash values "0b000000110000" and "0b000000111110" are allocated to the processing core #3; the sub-group with the upper M-digit hash value of "0b000000110001" is allocated to the processing core #1.

The value in the entry "allocation destination processing core" of the allocation table which is related to the upper N-digit hash value "0b00000011" is changed into a pointer to the extended allocation table. Then, "400" is stored in the entry "aggregation threshold" for the upper N-digit hash value "0b00000011", as an aggregation threshold. If the total number of flows for sub-groups with the upper N-digit hash value "0b00000011" becomes less than 400, the sub-groups into which the group has been divided are aggregated. After that, the extended allocation table is deleted.

In response to the dividing of a group, the entries "number of flows" and "concatenation list" in the processing core management table are also updated.

Before no groups are divided as illustrated in FIG. 10, the numbers of flows for the processing cores #1, #2, and #3 are 1000, 500, and 0, respectively. In this case, a large number of flows are allocated in the processing core #1. After the group has been divided as illustrated in FIG. 11, the numbers of flows for the processing cores #1, #2, and #3 are 600, 500, and 400, respectively. In this case, the flows are relatively evenly distributed among the processing cores. Dividing a group in this manner makes it possible to suppress flows from being concentrated in a specific processing core.

One or more sub-groups with an upper M-digit hash value in the extended allocation table may be further divided. In this case, an extended allocation table for an upper L-digit hash value (M<L) may be created.

As the example illustrated in FIG. 11, the allocation table and the extended allocation table configure a hierarchical structure. Hereinafter, an extended allocation table created in response to the dividing of a group is referred to as a lower-stage extended allocation table; an allocation table or an extended allocation table contains a pointer to an extended allocation table in the entry "allocation destination processing core" is referred to as an upper-stage allocation table or an extended allocation table.

Process Flow

Figure 12A:
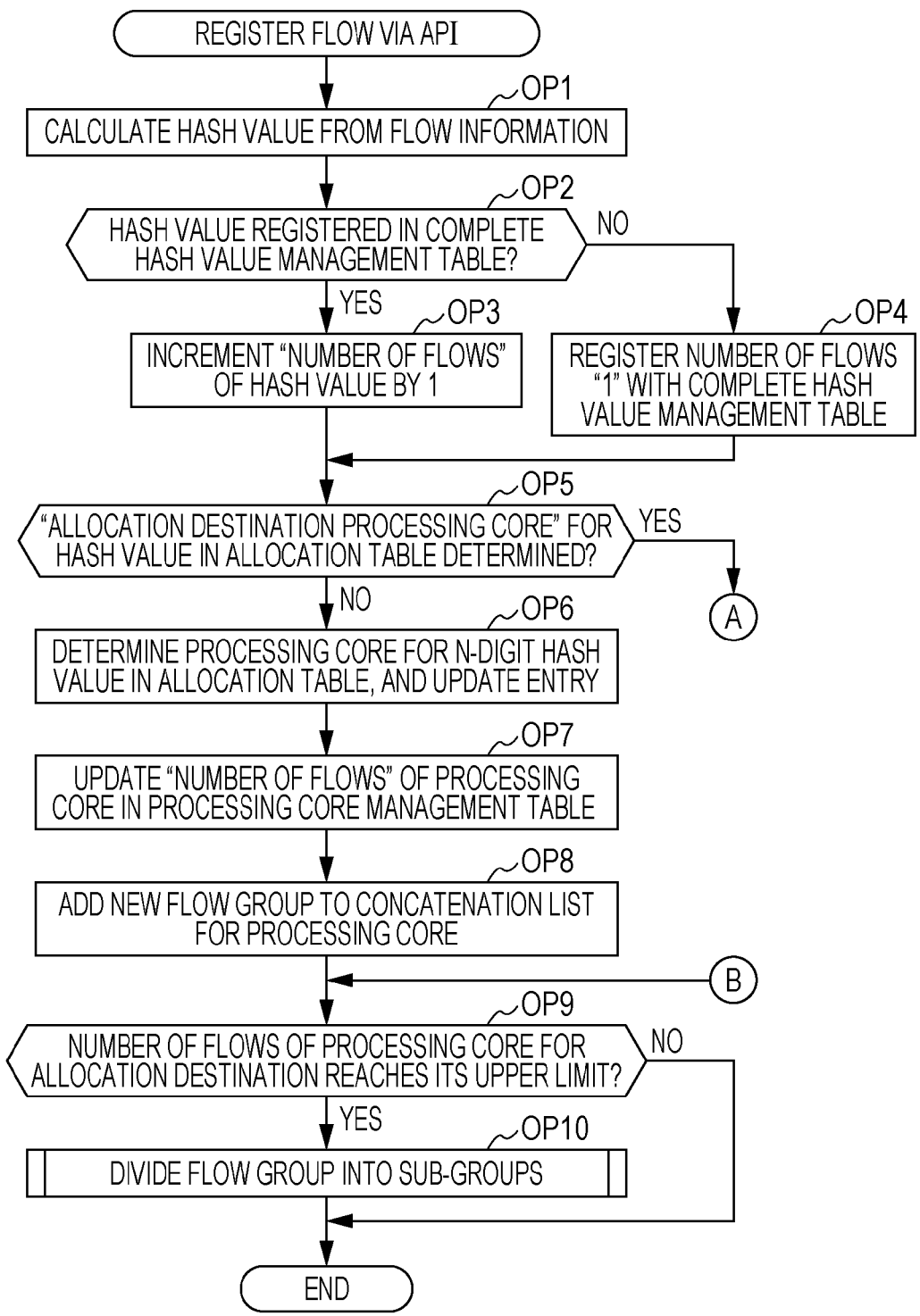
FIG. 12A is an exemplary flowchart of a process of registering flows which an allocation control core performs.
Figure 12B:
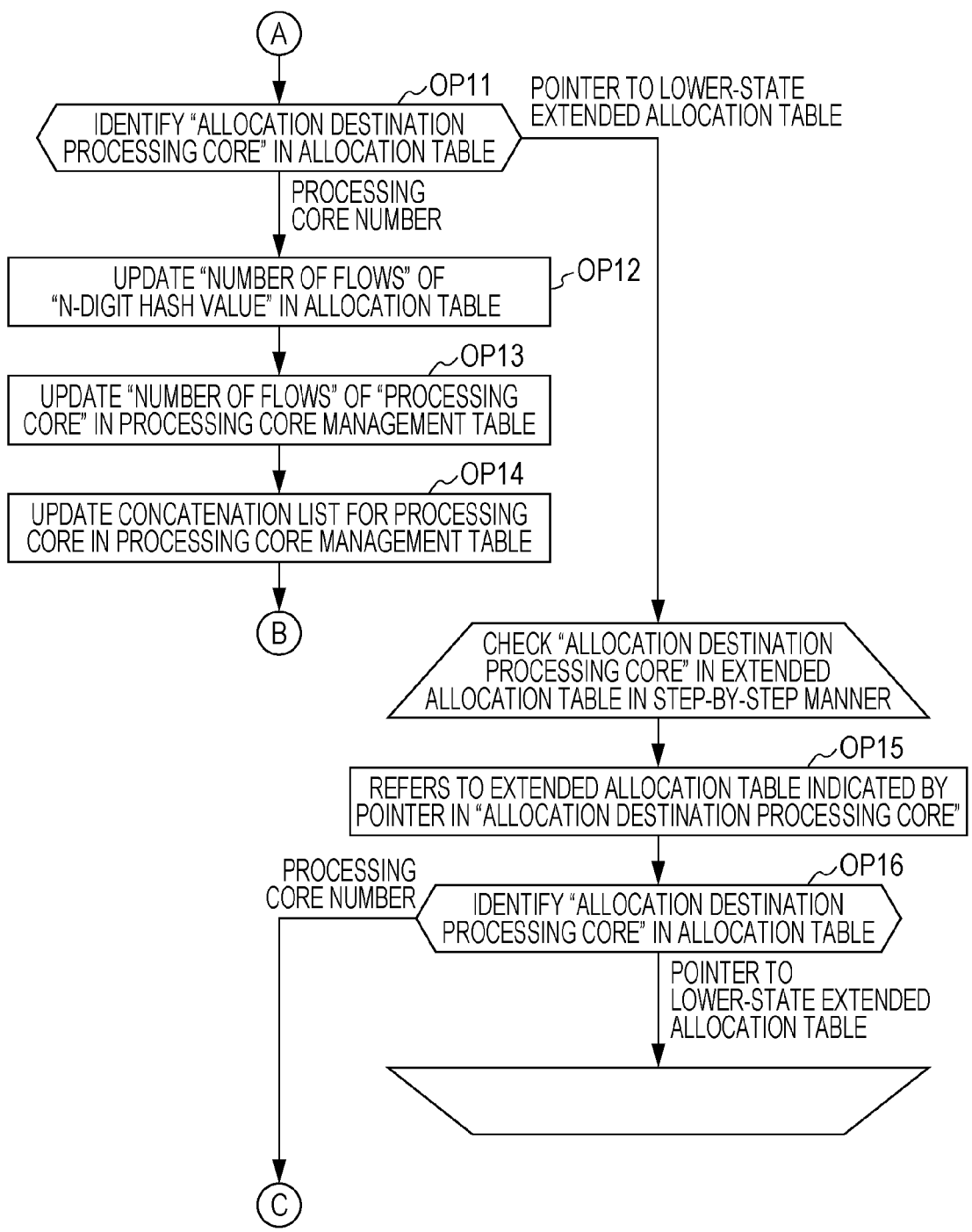
FIG. 12B is an exemplary flowchart of the process of registering flows which the allocation control core performs.
Figure 12C:
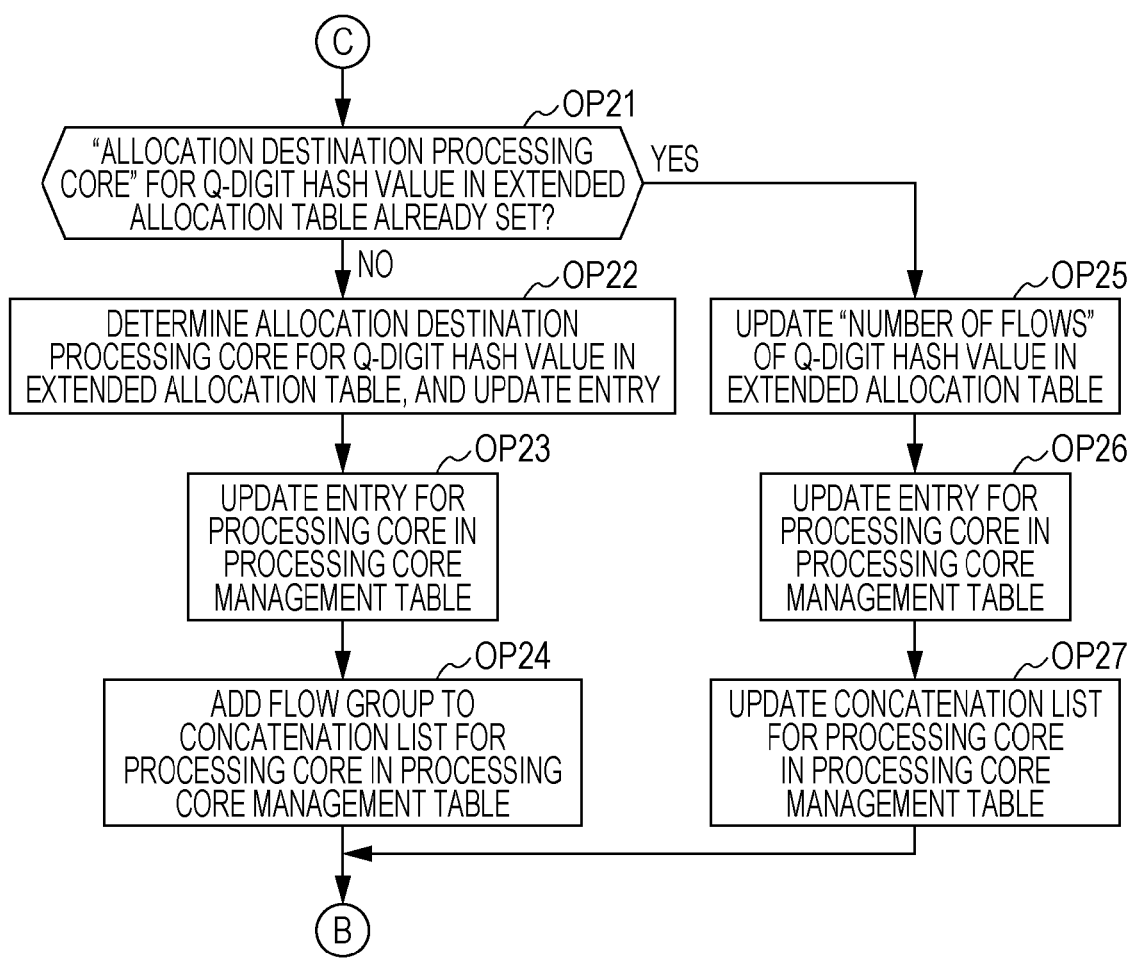
FIG. 12C is an exemplary flowchart of the process of registering flows which the allocation control core performs.

FIGS. 12A, 12B, and 12C are exemplary flowcharts of a process of registering flows which the allocation control core 11 will perform. The process in FIG. 12A is initiated in response to a notification of flow information which is transmitted from the SIP server 2 to the allocation control core 11 via the API. This flow is referred to below as a process target flow.

In OP1, the allocation control core 11 calculates the hash value from the received flow information. Next, the allocation control core 11 proceeds to perform the process in OP2.

In OP2, the allocation control core 11 determines whether the complete hash value of the process target flow has been registered in the complete hash value management table. If the complete hash value of the process target flow has already been registered in the complete hash value management table (OP2: YES), the allocation control core 11 proceeds to perform the process in OP3. If the complete hash value of the process target flow has not yet been registered in the complete hash value management table (OP2: NO), the allocation control core 11 proceeds to perform the process in OP4.

In OP3, since the complete hash value of the process target flow has already been registered in the complete hash value management table, the allocation control core 11 increments, by 1, the value in the entry "number of flows" of the complete hash value management table which is related to the complete hash value of the process target flow, thereby updating this entry. Next, the allocation control core 11 proceeds to perform the process in OP5.

In OP4, since the complete hash value of the process target flow has not yet been registered in the complete hash value management table, the allocation control core 11 registers the hash value of the process target flow with the complete hash value management table. In this case, "1" is registered with the entry "number of flows". Next, the allocation control core 11 proceeds to perform the process in OP5.

In OP5, the allocation control core 11 determines whether a value has been entered in the entry "allocation destination processing core" of the allocation table which is related to the upper N-digit hash value of the process target flow. If a value has already been entered therein (OP5: YES), the allocation control core 11 proceeds to perform the process in OP11 of FIG. 12B. If no value has not been entered therein, that is, if it is null (OP5: NO), the allocation control core 11 proceeds to perform the process in OP6.

In OP6, the allocation control core 11 determines to which processing core the group with the upper N-digit hash value A of the process target flow is to be allocated. Then, the allocation control core 11 updates the related entries "allocation destination processing core" and "number of flows" in the allocation table. The processing core determined thus is selected from processing cores for each of which the number of flows does not reach its upper limit. In this case, "1" is registered with the related entry "number of flows" of the allocation table. The allocation control core 11 proceeds to perform the process in OP7.

In OP7, the allocation control core 11 increments, by 1, the value in the entry "number of flows" of the processing core management table which is related to the processing core selected in OP6, thereby updating this entry. Next, the allocation control core 11 proceeds to perform the process in OP8.

In OP 8, since a new flow group is added, the allocation control core 11 adds this new flow group to the last of the concatenation list in the processing core management table for the processing core to which the new flow group has been allocated. Next, the allocation control core 11 proceeds to perform the process in OP9.

In OP9, the allocation control core 11 determines whether the registered number of flows for the processing core selected reaches its upper limit. If the registered number of flows for the processing core selected reaches its upper limit (OP9: YES), the allocation control core 11 proceeds to perform the process in OP10. In OP10, the allocation control core 11 divides the flow group. Details of dividing a flow group will be described later with reference to FIG. 13. After dividing a flow group, the allocation control core 11 concludes the process illustrated in FIG. 12A.

If the registered number of flows for the processing core selected does not reach its upper limit (OP9: NO), the allocation control core 11 concludes the process of FIG. 12A.

The process of FIG. 12B is performed when a value has already been entered in the entry "allocation destination processing core" of the allocation table which is related to the upper N-digit hash value of the process target flow (OP5: YES in FIG. 12A).

In OP11, the allocation control core 11 identifies the value in the entry "allocation destination processing core" of the allocation table which is related to the upper N-digit hash value of the process target flow. If the value in this entry is an identification number of a processing core, the allocation control core 11 proceeds to perform the process in OP12. If the value in this entry is a pointer to an extended allocation table, the allocation control core 11 proceeds to perform the process in OP15.

The process in OP12 to OP14 is performed when the value in the entry "allocation destination processing core" of the allocation table which is related to the upper N-digit hash value of the process target flow is the identification number of the processing core. In OP12, the allocation control core 11 increments, by 1, the value in the related entry "number of flows" of the allocation table, thereby updating this entry. Next, the allocation control core 11 proceeds to perform the process in OP13.

In OP13, the allocation control core 11 increments, by 1, the value in the related entry "number of flows" of the processing core management table, thereby updating this entry. Next, the allocation control core 11 proceeds to perform the process in OP14.

In OP14, the allocation control core 11 updates the concatenation list for the processing core to which the process target flow has been allocated. More specifically, the allocation control core 11 increments the number of flow groups in the concatenation list by 1, and re-arranges the flow groups in the concatenation list in decreasing order of the number of flows. Next, the allocation control core 11 proceeds to perform the process in OP9 of FIG. 12A.

The process in OP15 and OP16 is performed when the value in the entry "allocation destination processing core" of the allocation table which is related to the upper N-digit hash value of the process target flow is a pointer to a lower-stage extended allocation table. In OP15, the allocation control core 11 refers to the lower-stage extended allocation table that the pointer stored in the entry "allocation destination processing core" of the allocation table indicates. Next, the allocation control core 11 proceeds to perform the process in OP16.

In OP16, the allocation control core 11 identifies the value in the entry "allocation destination processing core" of the lower-stage extended allocation table which is related to the upper M-digit hash value of the process target flow. If the value in this entry is the identification number of one of the processing cores or if the entry is null, the allocation control core 11 proceeds to perform the process in OP21 in FIG. 12C. If the value in this entry is a pointer to another lower-stage extended allocation table, the lower-stage extended allocation table indicated by the pointer is subjected to the process the same as that in OP15 and OP16.

The process in OP21 to OP27 of FIG. 12C is performed when the value in the entry "allocation destination processing core" of the lower-stage extended allocation table which is related to the upper M-digit hash value of the process target flow is the identification number of one of the processing cores or null. Hereinafter, the number of digits of each hash value in the extended allocation table to be processed is denoted by Q (Q: integer; M≤Q≤the number of all the digits of a hash value).

In OP21, the allocation control core 11 determines whether a value in the entry "allocation destination processing core" of the extended allocation table which is related to the upper Q-digit hash value of the process target flow has already been set. If a value in the entry "allocation destination processing core" of the extended allocation table which is related to the upper Q-digit hash value of the process target flow has already been set (OP21: YES), the allocation control core 11 proceeds to perform the process in OP25. If a value in the entry "allocation destination processing core" of the extended allocation table which is related to the upper Q-digit hash value of the process target flow has not yet been set, or this entry is null (OP21: NO), the allocation control core 11 proceeds to perform the process in OP22.

In OP22, the allocation control core 11 determines to which processing core the group with the upper Q-digit hash value of the process target flow is to be allocated. Then, the allocation control core 11 updates the related entries "allocation destination processing core" and "number of flows" of the extended allocation table. In this case, "1" is registered with the related entry "number of flows" of the extended allocation table. Next, the allocation control core 11 proceeds to perform the process in OP23.

In OP23, the allocation control core 11 increments, by 1, the value in the entry "number of flows" of the processing core management table which is related to the processing core determined in OP22, thereby updating this entry. Next, the allocation control core 11 proceeds to perform the process in OP24.

In OP24, since the new flow group is added, the allocation control core 11 adds this flow group to the last of the concatenation list in the processing core management table for the determined processing core. Next, the allocation control core 11 proceeds to perform the process in OP9 of FIG. 12A.

The process in OP25 to OP27 is performed when the value in the entry "allocation destination processing core" of the lower-stage extended allocation table which is related to the upper Q-digit hash value of the process target flow is the identification number of one of the processing cores. In OP25, the allocation control core 11 increments, by 1, the value in the related entry "number of flows" of the extended allocation table, thereby updating this entry. Next, the allocation control core 11 proceeds to perform the process in OP26.

In OP26, the allocation control core 11 increments, by 1, the value in the entry "number of flows" of the processing core management table which is related to the entry "allocation destination processing core" of the allocation table, thereby updating this entry. Next, the allocation control core 11 proceeds to perform the process in OP27.

In OP27, the allocation control core 11 updates the concatenation list in the processing core management table for the processing core to which the process target flow is allocated. More specifically, the allocation control core 11 increments, by 1, the number of flows for the flow group related in the concatenation list and re-arranges the flow groups in the concatenation list in decreasing order of the number of flows. Next, the allocation control core 11 proceeds to perform the process in OP9 of FIG. 12A.

Figure 13:
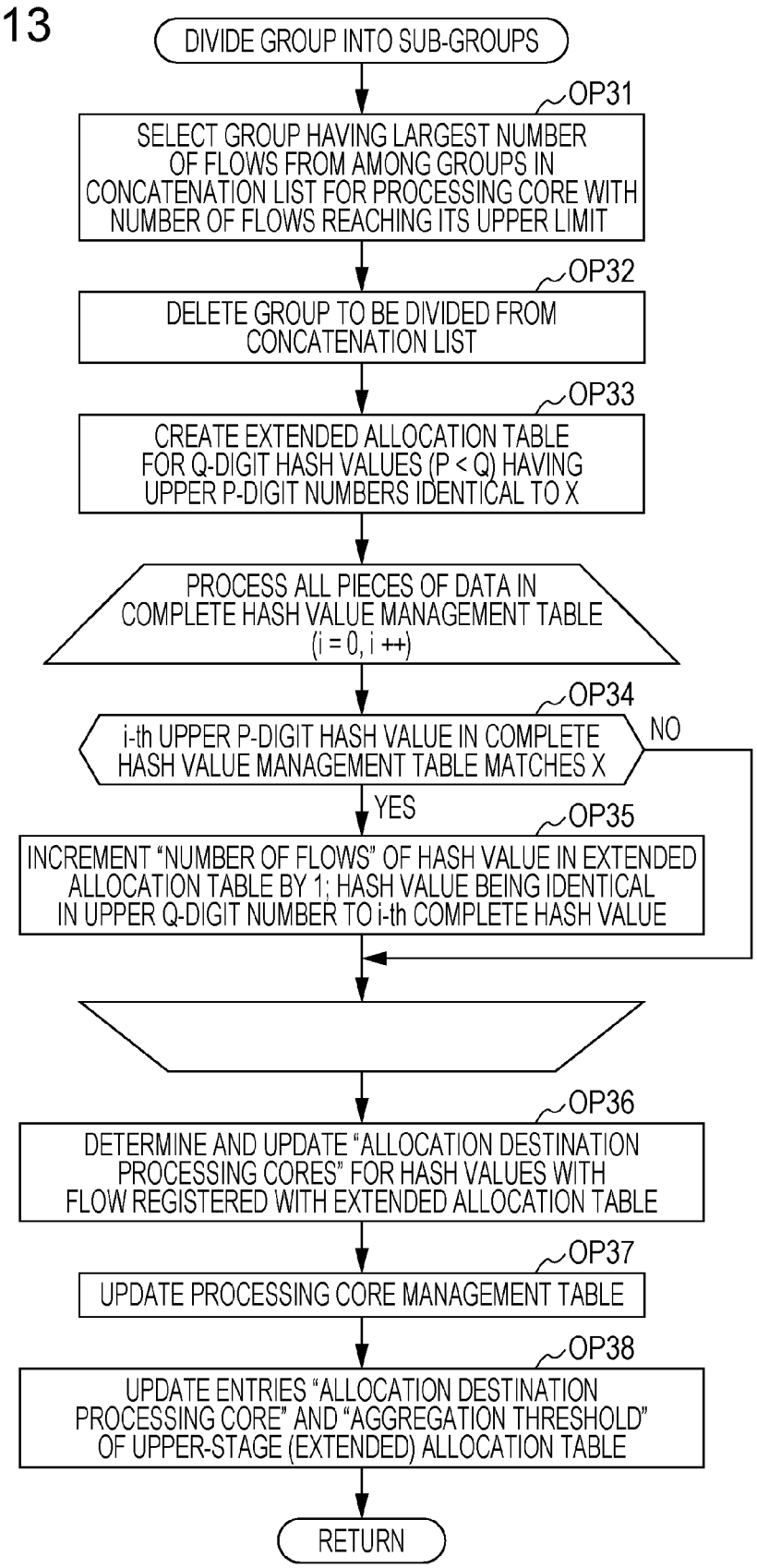
FIG. 13 is an exemplary flowchart of a process of dividing a group at OP10 in FIG. 12A.

FIG. 13 is an exemplary flowchart of the process of dividing a group in OP10 in FIG. 12A. In the process of FIG. 13, the number of digits of each hash value in an upper-stage allocation table or an extended allocation table is denoted by P (integer; $N \leq P < Q$); the number of digits of each hash value in a lower-stage extended allocation table is denoted by Q.

In OP31, from among groups in the concatenation list for a processing core for which the registered number of flows reaches its upper limit, the allocation control core 11 selects the group having the largest number of flows, and sets it as a group to be divided. Next, the allocation control core 11 proceeds to perform the process in OP32.

In OP32, the allocation control core 11 deletes the group to be divided from the concatenation list. Next, the allocation control core 11 proceeds to perform the process in OP33.

In OP33, the allocation control core 11 creates an extended allocation table for upper Q-digit hash values, each of which is identical in upper P-digit number to the hash value of the group to be divided. This upper P-digit number is denoted by X. At this stage, in the extended allocation table, the Q-digit hash values with the upper P digit numbers X are arranged in increasing order, and the entries "allocation destination processing core", "number of flows", and "aggregation threshold" are in an initial state, or null. Next, the allocation control core 11 proceeds to perform the process in OP34.

The process in OP34 and OP35 will be applied to all the pieces of input data in the complete hash value management table. Hereinafter, a variable i represents the sequence of the pieces of input data in the complete hash value management table. This variable i is initially set to 0, and is incremented by 1 every time the process of OP34 and OP35 is repeated.

In OP34, the allocation control core 11 determines whether X matches the upper P-digit numbers of the i-th complete hash value in the complete hash value management table. If X matches the upper P-digit number of the i-th complete hash value in the complete hash value management table (OP34: YES), the allocation control core 11 proceeds to perform the process in OP35. If X does not match the upper P-digit number of the i-th complete hash value in the complete hash value management table (OP34: NO), the process of OP34 will be applied to the next piece of input data.

In OP35, the allocation control core 11 increments, by 1, the value in the entry "number of flows" in the extended allocation table which is identical in upper Q-digit number to the i-th value in the entry "complete hash value" in the complete hash value table. Then, if all the pieces of input data in the complete hash value table have not yet been processed, the process of OP34 is applied to the next piece of input data. If the process of OP34 and OP35 has been applied to all the pieces of input data in the complete hash value table, the allocation control core 11 proceeds to perform the process in OP36.

In OP36, the allocation control core 11 identifies allocation destination processing cores for each of which the number of flows is registered with the extended allocation table, or for each of which the entry "number of flows" is not null, and updates the extended allocation table. Next, the allocation control core 11 proceeds to perform the process in OP37.

In OP37, the allocation control core 11 updates the processing core management table and the concatenation list, based on the extended allocation table. More specifically, the allocation control core 11 adds the total number of flows of processing cores in the extended allocation table to the value in the entry "number of flows" of the processing core management table which is related to the same processing core. Following this, if a group in the extended allocation table has the number of flows equal to or more than 1 and the processing core to which this group is allocated has been determined, the allocation control core 11 adds the group to the concatenation list for this processing core and re-arranges the groups in the concatenation list in increasing order of the number of flows therefor. Next, the allocation control core 11 proceeds to perform the process in OP38.

In OP38, the allocation control core 11 updates the related entries "allocation destination processing core" and "aggregation threshold" of the upper-stage allocation table or the extended allocation table. More specifically, the allocation control core 11 stores a pointer to the lower-stage extended allocation table in the related entry "allocation destination processing core" of the upper-stage allocation table or the extended allocation table. In addition, the allocation control core 11 stores a preset value in the related entry "aggregation threshold" of the upper-stage allocation table or the extended allocation table. By performing the process of OP38, the process of dividing a group in FIG. 13 is concluded.

In OP31, from among groups in the concatenation list for a processing core for each of which the registered number of flows reaches its upper limit, one having the largest number of flows is selected as a group to be divided. A method of selecting a group to be divided is, however, not limiting. For example, a group to be divided may be selected randomly from among groups in the concatenation list for a processing core for each of which the registered number of flows reaches its upper limit. Alternatively, a group to be divided may be one of these groups which has the smallest number of flows.

Figure 14A:
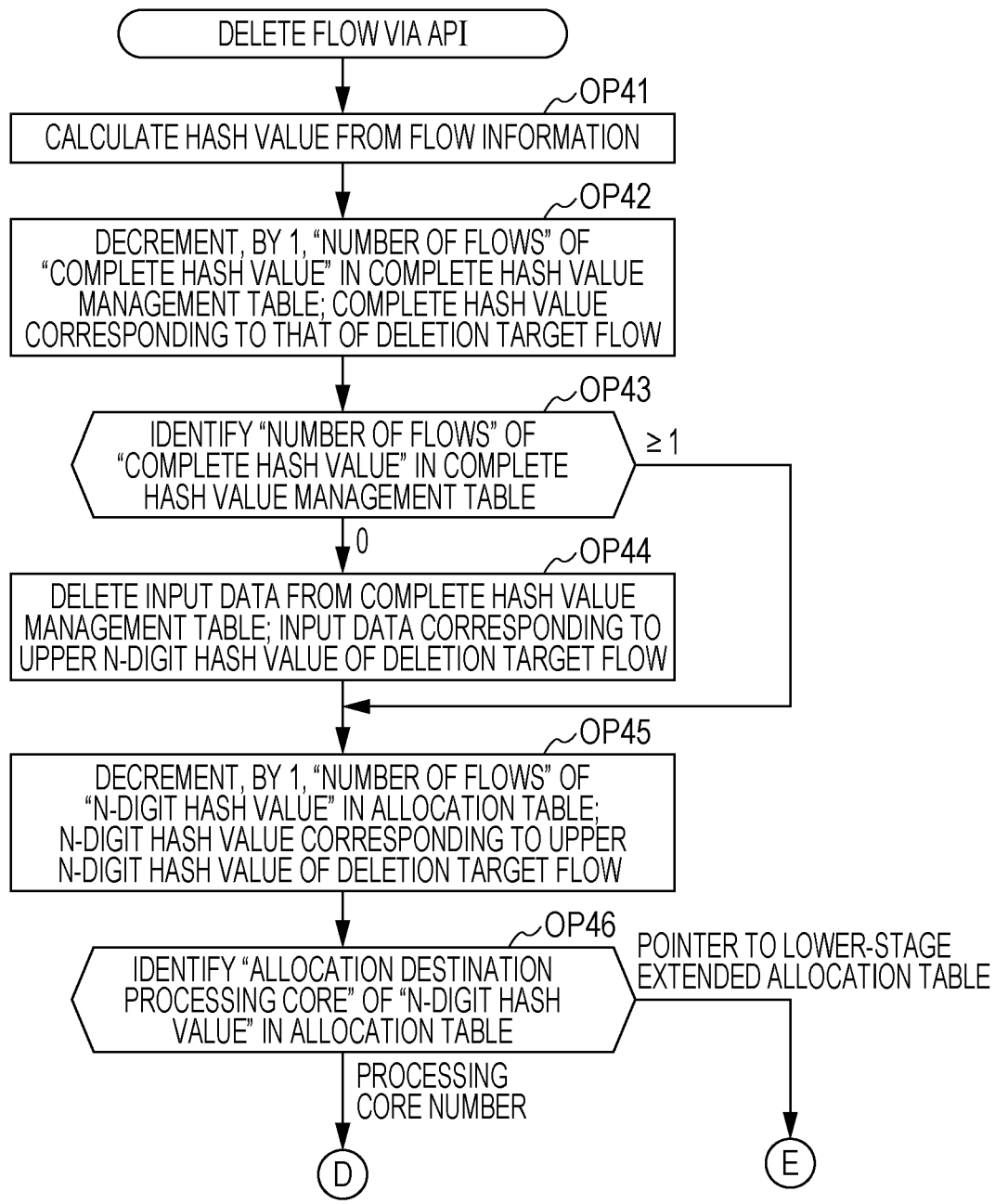
FIG. 14A is an exemplary flowchart of a process of deleting a flow which the allocation control core performs.

FIGS. 14A to 14D are exemplary flowcharts of a process of deleting a flow which the allocation control core performs. The process of the flowchart in FIG. 14A is initiated in response to the reception of a notification of flow information on a deletion target which the SIP server 2 transmits to the allocation control core 11 via the API.

In OP41, the allocation control core 11 calculates the hash value from the flow information. Next, the allocation control core 11 proceeds to perform the process in OP42.

In OP42, the allocation control core 11 searches the complete hash value management table for the complete hash value that the hash value of the deletion target flow matches. In addition, it decrements, by 1, the value in the related entry "number of flows" in the complete hash value management table. Next, the allocation control core 11 proceeds to perform the process in OP43.

In OP43, the allocation control core 11 identifies the value in the entry "number of flows" in the complete hash value management table which is related to the hash value of the deletion target flow. If "0" is entered in this entry, the allocation control core 11 proceeds to perform the process in OP44. If "1 or more" is entered therein, the allocation control core 11 proceeds to perform the process in OP45.

In OP44, since "0" is entered in the entry "number of flows" of the complete hash value management table which is related to the hash value of the deletion target flow, the allocation control core 11 deletes the related input date from the complete hash value management table. Next, the allocation control core 11 proceeds to perform the process in OP45.

In OP45, the allocation control core 11 searches the allocation table for the N-digit hash value that matches the upper N-digit hash value of the deletion target flow. In addition, it decrements, by 1, the value in the entry "number of flows" in the allocation table. Next, the allocation control core 11 proceeds to perform the process in OP46.

In OP46, the allocation control core 11 identifies the value in the related entry "allocation destination processing core" in the allocation table. If the identification number of a processing core is entered in the related entry "allocation destination processing core" in the allocation table, the allocation control core 11 proceeds to perform the process in OP51 of FIG. 14B. If a pointer to a lower-stage extended allocation table is entered in the related entry "allocation destination processing core" in the allocation table, the allocation control core 11 proceeds to perform the process in OP61 of FIG. 14C.

Figure 14B:
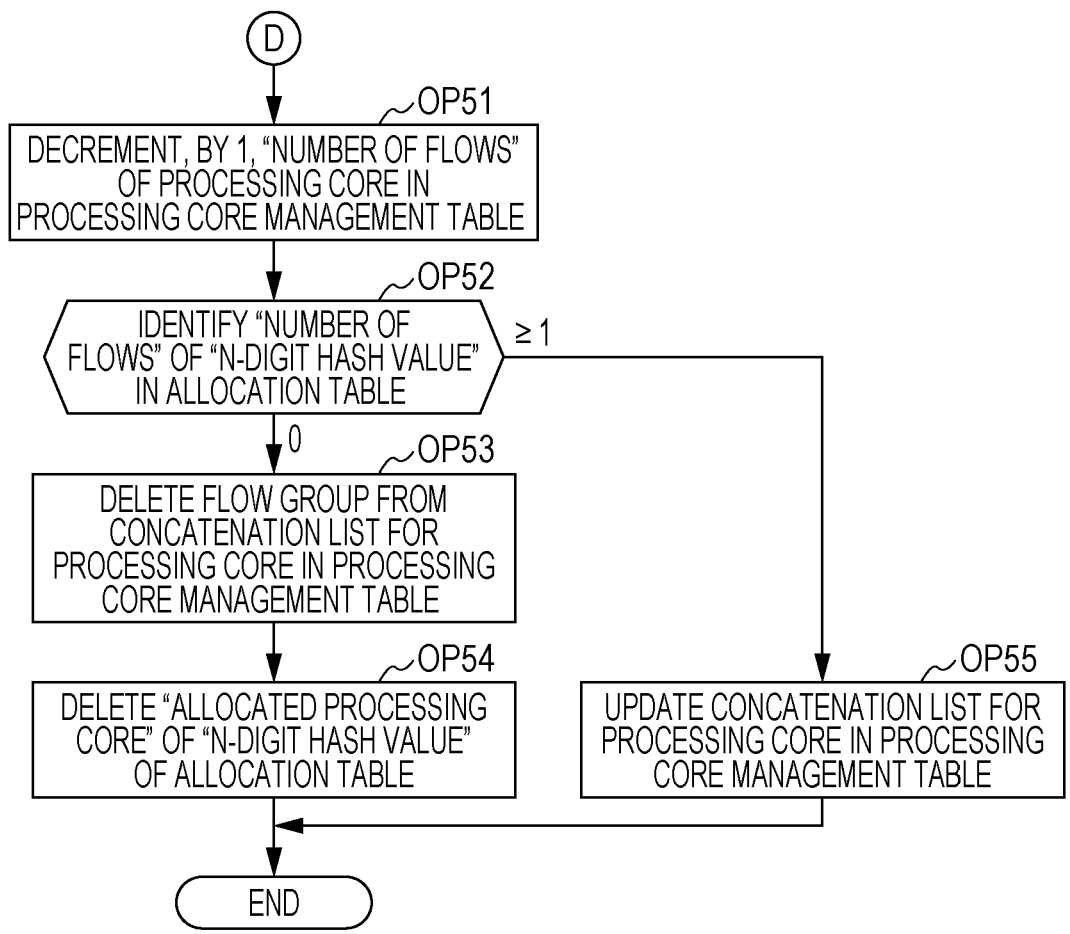
FIG. 14B is an exemplary flowchart of the process of deleting a flow which the allocation control core performs.

The process in OP51 to OP55 of FIG. 14B is performed when the identification number of a processing core is entered in the entry "allocation destination processing core" in the allocation table which is related to the upper N-digit hash value of the deletion target flow. In OP51, the allocation control core 11 decrements, by 1, the value in the entry "number of flows" of the processing core management table which is related to the processing core to which the deletion target flow is allocated. Next, the allocation control core 11 proceeds to perform the process in OP52.

In OP52, the allocation control core 11 identifies the value in the entry "number of flows" in the allocation table which is related to the upper N-digit hash value of the deletion target flow. If "0" is entered in this entry, the allocation control core 11 proceeds to perform the process in OP53. If "1 or more" is entered therein, the allocation control core 11 proceeds to perform the process in OP55.

In OP53, since "0" is entered in the related entry "number of flows" in the allocation table, the allocation control core 11 deletes the group with the upper N-digit hash value of the deletion target flow from the concatenation list in the processing core management table for the processing core to which the deletion target flow has been allocated. Next, the allocation control core 11 proceeds to perform the process in OP54.

In OP54, the allocation control core 11 deletes the value from the entry "allocation destination processing core" of the allocation table which is related to the upper N-digit hash value of the deletion target flow, so this entry becomes null. Then, the allocation control core 11 concludes the process of FIG. 14B.

In OP55, "1 or more" is entered in the related entry "number of flows" in the allocation table, the allocation control core 11 decrements, by 1, the number of flows for a group with the upper N-digit hash value of the deletion target flow in the concatenation list in the processing core management table for the related processing core, thereby updating this concatenation list. Then, the allocation control core 11 concludes the process of FIG. 14B.

Figure 14C:
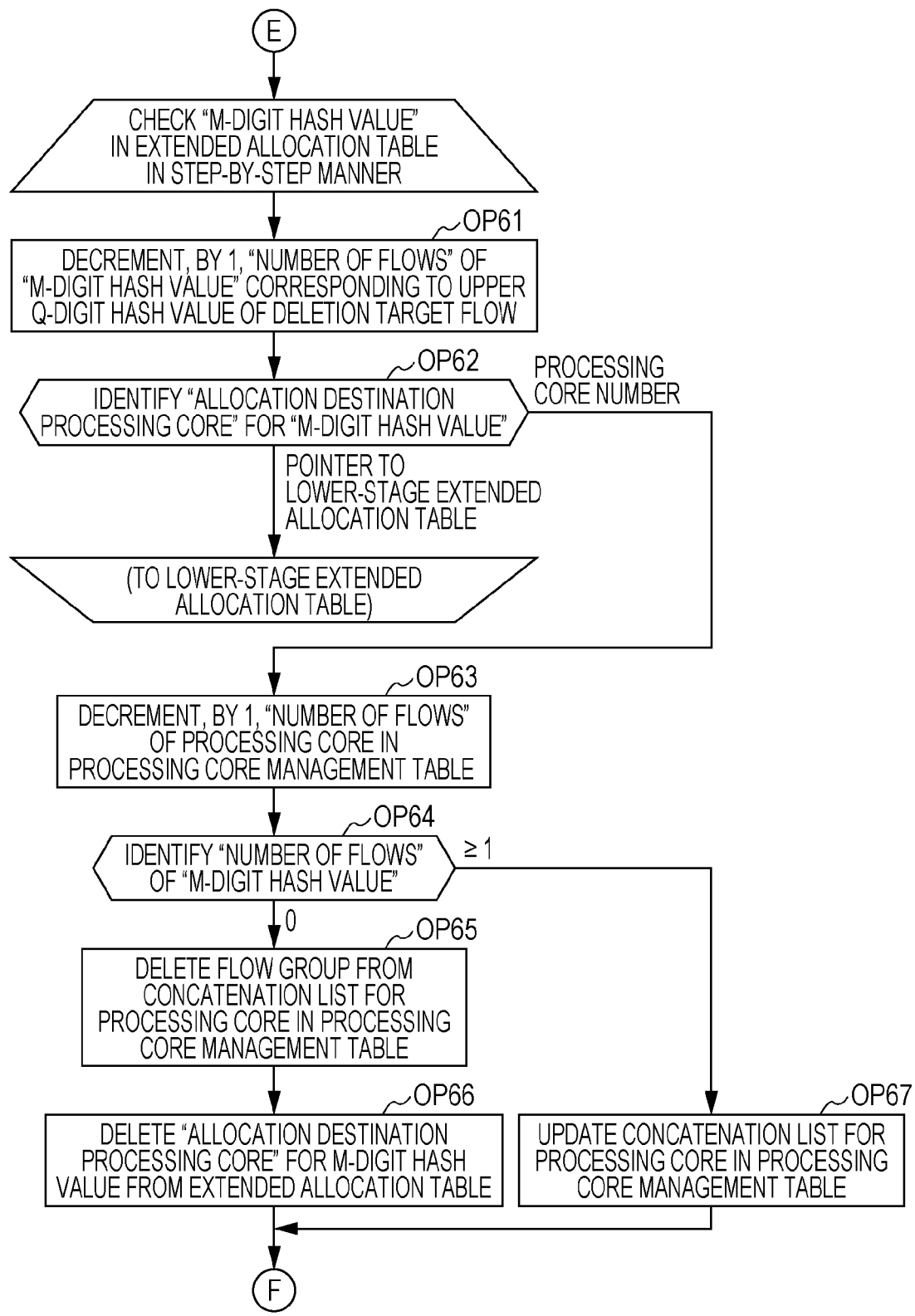
FIG. 14C is an exemplary flowchart of the process of deleting a flow which the allocation control core performs.

The process following OP61 of FIG. 14C is performed when a pointer to a lower-stage extended allocation table is entered in the entry "allocation destination processing core" in the allocation table which is related to the upper N-digit hash value of the deletion target flow.

The process of OP61 and OP62 is performed every time a pointer to a lower-stage extended allocation table is present in the entry "allocation destination processing core" of the extended allocation table which is related to the upper N-digit hash value of the deletion target flow. In other words, the process of OP61 and OP62 is performed in order to check in a step-by-step manner whether a lower-stage extended allocation table is present under the extended allocation table.

In OP61, the allocation control core 11 decrements, by 1, the value in the entry "number of flows" in the extended allocation table which is related to the upper Q-digit hash value of the deletion target flow. Next, the allocation control core 11 proceeds to perform the process in OP62.

In OP62, the allocation control core 11 identifies the value in the entry "allocation destination processing core" in the extended allocation table which is related to the upper Q-digit hash value of the deletion target flow. If a pointer to another lower-stage extended allocation table is entered in this entry, the process from OP61 is applied to this lower-stage extended allocation table. If the identification number of a processing core is entered therein, the allocation control core 11 proceeds to perform the process in OP63.

In OP63, the allocation control core 11 decrements, by 1, the value in the entry "number of flows" in the processing core management table which is related to the processing core indicated by the related entry "allocation destination processing core" in the extended allocation table. Next, the allocation control core 11 proceeds to perform the process in OP64.

In OP64, the allocation control core 11 identifies the value in the entry "number of flows" in the extended allocation table which is related to the upper Q-digit hash value of the deletion target flow. If "0" is entered in this entry, the allocation control core 11 proceeds to perform the process in OP65. If "1 or more" is entered therein, the allocation control core 11 proceeds to perform the process in OP67.

In OP65, since "0" is entered in the related entry "number of flows" in the extended allocation table, the allocation control core 11 deletes the group with the upper Q-digit hash value of the deletion target flow from the concatenation list in the processing core management table for the related processing core. Next, the allocation control core 11 proceeds to perform the process in OP66.

In OP66, the allocation control core 11 deletes the value from the entry "allocation destination processing core" in the extended allocation table which is related to the upper Q-digit hash value of the deletion target flow, so this entry is null. Next, the allocation control core 11 proceeds to perform the process in OP68 of FIG. 14D.

In OP67, since "1 or more" is entered in the related entry "number of flows" in the extended allocation table, the allocation control core 11 decrements, by 1, the number of flows for the group, to which the deletion target flow pertains, in the concatenation list for the related processing core in the processing core management table, thereby updating this concatenation list. Next, the allocation control core 11 proceeds to perform the process in OP68 of FIG. 14D.

The process following OP68 in FIG. 14C is performed in order to check in a step-by-step manner whether to aggregate sub-groups in individual extended allocation tables in order from the lowermost one in the hierarchical structure. Note that the process following OP68 is repeated for the number of extended allocation tables configuring the hierarchical structure.

In OP68, the allocation control core 11 determines whether the value in the entry "number of flows" of the upper-stage allocation table or the extended allocation table which is related to the upper P-digit hash value of the deletion target flow is equal to or less than the value in the entry "aggregation threshold" thereof. If the value in the entry "number of flows" is greater than the value in the entry "aggregation threshold" (OP68: NO), the allocation control core 11 concludes the process of FIG. 14D without aggregating the sub-groups.

If the value in the entry "number of flows" is equal to or less than the value in the entry "aggregation threshold" (OP68: YES), the allocation control core 11 proceeds to perform the process in OP69.

In OP69, the allocation control core 11 determines whether a processing core that has a capacity to accommodate all the flows when the sub-groups are aggregated or the value in the entry "number of flows" in the upper-stage allocation table or the extended allocation which is related to the upper P-digit hash value of the deletion target flow. This determination is based on the processing core management table.

If there is no processing core that has a capacity to accommodate all the flows when the sub-groups are aggregated (OP69: NO), it is not possible to aggregate the sub-groups, and therefore the allocation control core 11 concludes the process in FIG. 14D. If there is a processing core that has a capacity to accommodate all the flows when the sub-groups are aggregated (OP69: YES), it is possible to aggregate the sub-groups, and therefore the allocation control core 11 proceeds to perform the process of OP70.

In OP70, the allocation control core 11 decrements the values in the entry "number of flows" of the processing core management table for the processing cores corresponding to the allocation destination processing cores in the current-stage extended allocation table, by the numbers of flows in the current-stage extended allocation table. Next, the allocation control core 11 proceeds to perform the process in OP71.

In OP71, the allocation control core 11 deletes the group with the Q-digit hash value which has the number of flows equal to or more than 1 from the concatenation list for the processing core to which the group is allocated. Next, the allocation control core 11 proceeds to perform the process in OP72.

In OP72, the allocation control core 11 updates the input data concerning the upper P-digit hash value of the deletion target flow in the upper-stage allocation table or the extended allocation table. More specifically, the allocation control core 11 replaces a pointer to the lower-stage extended allocation table in the related entry "allocation destination processing core" of the upper-stage allocation table or the extended allocation table with the identification number of the processing core. This processing core is selected from processing cores that have a capacity to accommodate all the flows when the sub-groups are aggregated. In addition, the allocation control core 11 deletes the value from the related entry "aggregation threshold" of the upper-stage allocation table or the extended allocation table. Next, the allocation control core 11 proceeds to perform the process in OP73.

In OP73, the allocation control core 11 adds the value in the related entry "number of flows" in the upper-stage allocation table or the extended allocation table to the value in the entry "number of flows" in the processing core management table which is related to the processing core selected in OP72. Next, the allocation control core 11 proceeds to perform the process in OP74.

In OP74, the allocation control core 11 adds the group with the upper P-digit hash value of the deletion target flow to the concatenation list in the processing core management table for the processing core selected in OP72. Then, the allocation control core 11 re-arranges the groups in this concatenation list in decreasing order of the number of flows. Next, the allocation control core 11 proceeds to perform the process in OP75.

In OP75, the allocation control core 11 deletes the current-stage extended allocation table. If another extended allocation table is present over the deleted, extended allocation table, the allocation control core 11 subjects this extended allocation table to the process from OP68 again. If the allocation table is present directly over the deleted, extended allocation table, the allocation control core 11 concludes the process of FIG. 14D.

Effects of First Embodiment

If the registered number of flows for a processing core exceeds its upper limit, the packet processing device 1 in the first embodiment divides one of flow groups allocated to this processing core into some sub-groups, and allocates the sub-groups to processing cores. This makes it possible to suppress flows from being concentrated in a specific processing core, allocating evenly flows among processing cores, as illustrated in FIGS. 10 and 11.

In response to the dividing of a group, the packet processing device 1 in the first embodiment updates entries in an allocation table or an extended allocation table which are related to this group, but in turn, does not update entries therein related to other groups. Moreover, in the allocation table and the extended allocation table, entries are prepared in advance for all possible upper N-digit and M-digit hash values, respectively. The data structure in the allocation table is maintained independently of the dividing of a group, because it is created in a storage region within a main storage device 102 which is different from that in which the extended allocation table is created. For this reason, it is possible to subject groups to be not divided to a process in parallel with the dividing of a group, suppressing the dividing of a group from affecting the overall system.

When a group is divided, the entries of the allocation table and the extended allocation table which are related to groups to be not divided are not updated. This shortens the time devoted to performing a process of updating tables by using the allocation control core 11. This also shortens the time devoted to updating the allocation table and the extended allocation table that the allocation core 12 refers to, thus reducing packet losses and delays that would be caused during the time over which the allocation core 12 is waiting to refer to the tables. Consequently, it is possible to suppress overtaking of packets in a flow, performing processes stably.

The first embodiment is assumed to be applied to systems that support audio communication, which is one of communications sensitive to delays. In the first embodiment, the SIP server 2 acquires flow information from a SIP packet (control packet) and passes this flow information to the packet processing device 1. This enables the packet processing device 1 to determine the allocation destination of the flow before an audio packet (user packet) is transmitted, thus reducing delays.

Because of audio packets with the same packet size, it is possible to control easily a workload placed on the packet processing device 1. Since a session start and a session end are informed explicitly in audio communication, the first embodiment is especially technically effective in audio communication.

The packet processing device 1 in the first embodiment creates flow groups, based on hash values. These hash values are less likely to converge to substantially the same one, because a hash value is independent of an IP address, a port number, and other specific information contained in flow information. When a group is divided, sub-groups are created with hash values each having many more digits. Therefore, it is possible to divide a group with a simple process and without involving any re-calculation.

Other Embodiments

The first embodiment is assumed to be applied to networks that handle audio packets; however its technique is applicable to communication networks that handle various types of packets in addition to audio packets. Exemplary application systems include a network for communication conforming to a transmission control protocol (TCP) such as hypertext transfer protocol (HTTP) or file transfer protocol (FTP). Suppose the technique of the first embodiment is applied to a network via which control packets and user packets are individually transmitted to different devices, like audio packets. Due to the absence of the SIP server 2, the packet processing device 1 may start a process of determining a processing core to which a group is allocated, in response to the reception of a packet with a new hash value.

In the first embodiment, an allocation table and an extended allocation table are created using upper N-digit hash values and upper M-digit hash values, respectively, calculated from flow information; however there is no limitation on a method of creating these tables. For example, a lower N-digit hash value and a lower M-digit hash value may be used. Alternatively, an arbitrary number of digits of a hash value may be used.

In the first embodiment, groups are created based on hash values calculated from flow information; however there is no limitation on a method of creating groups. Alternatively, information other than hash values may be used to create groups. Any information acquired from packets, such as destination IP addresses, source IP addresses, destination port numbers, or source port numbers, may be used. To give an example, destination IP addresses may be used to create an allocation table, instead of upper N-digit hash values, and source IP addresses may be used to create an extended allocation table, instead of upper M-digit hash values. In this case, a destination IP address is an example of "first identification information"; a source IP address is an example of "second identification information". To give another example, source IP addresses may be used to create an allocation table, and destination IP addresses may be used to create an extended allocation table.

The first embodiment has been described on the assumption that packets are allocated to a plurality of processing cores in the packet processing device 1. However, the allocation control core 11, the allocation core 12, and the processing cores may be embodied by independent processing devices. More specifically, a processing device that acts as the allocation control core 11 may determine to which processing core a flow group is to be allocated. A processing device that acts as the allocation core 12 may forward packets to a processing device that acts as the determined processing core. This processing device may process the packets.

The first embodiment is assumed to be applied to a network system that processes packets for use in communication; however the technique of the first embodiment is not limited to network systems that process packets for use in communication and applicable to various types of distributed processing system. An exemplary application is a system in a data center that subjects a plurality of data blocks to a distribution process or some other process in parallel with one another. In this case, data blocks may be classified into groups, based on, for example, identification information on a database in which data is to be stored, data types, or creators for data.

Second Embodiment

In the first embodiment, a fixed value pre-set by an administrator is used as the number of upper digits (M) of the hash value used in group identification when a flow group is divided. In a second embodiment, the number of upper digits (M) of the hash value used in group identification in a to-be-newly-created M-digit extended allocation table is decided upon in accordance with a deviation of flows in respective flow sub-groups created by division (hereinafter, simply referred to as sub-groups) and a deviation of flows in respective processing cores. In the second embodiment, a description regarding constituent elements used in common in the first embodiment is omitted.

Figure 15:
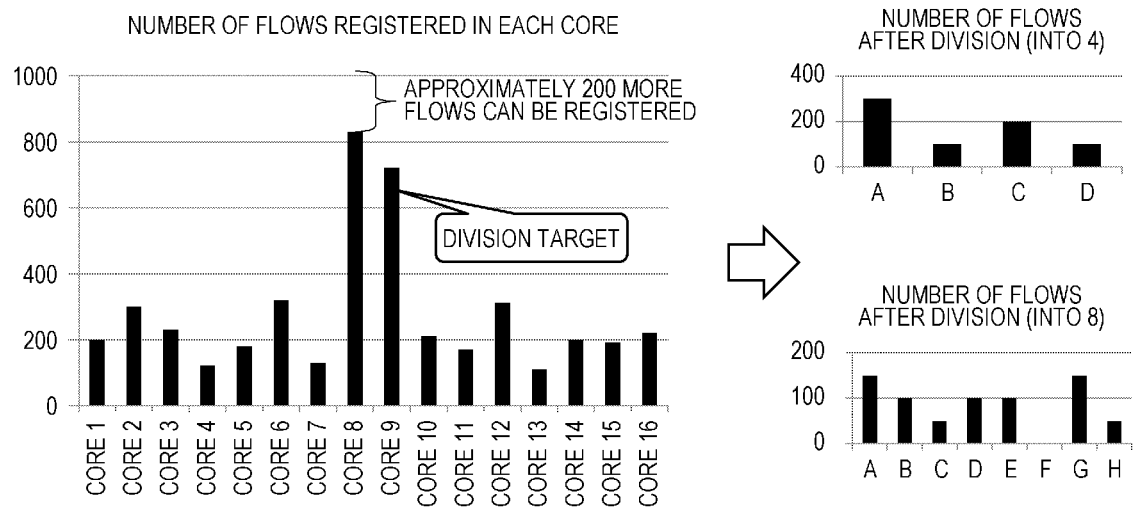
FIG. 15 illustrates an exemplary relationship between the number of flows registered in each processing core and the number of sub-groups created by dividing a flow group.

FIG. 15 illustrates an exemplary relationship between the number of flows registered in each processing core and the number of sub-groups created by dividing a flow group. The number of sub-groups created by dividing a flow group is based on an increase (M−N) in the number of upper digits of the hash value used in group identification when the flow group is divided and, thus, is equal to $2^{(M-N)}$. Hereinafter, an increase in the number of upper digits of the hash value used in group identification when a flow group is divided is simply referred to as a "hash extension width".

FIG. 15 illustrates an example in which flows are registered in processing cores 1 to 16. For example, a case of dividing a group of approximately 700 flows registered in the processing core 9 will be described.

FIG. 15 also illustrates graphs of the number of flows registered in sub-groups created when the group of approximately 700 flows registered in the processing core 9 is divided into four sub-groups and eight sub-groups. In the case of dividing the flow group into four sub-groups, the hash extension width is equal to 2 ($2^2$=4). In the case of dividing the flow group into eight sub-groups, the hash extension width is equal to 3 ($2^3$=8). Comparison between division into four sub-groups and division into eight sub-groups indicates that the largest value among the numbers of flows registered in the respective sub-groups tends to be smaller in the case of division into eight sub-groups, as illustrated in FIG. 15.

In the example illustrated in FIG. 15, many flows are concentrated in the processing core 8, and it is assumed that the processing core 8 is capable of accommodating approximately 200 more flows. If the processing core 8 is selected as a processing core to which (approximately, 300) flows of a sub-group A, which is created by division of the flow group of approximately 700 flows registered in the processing core 9 into four sub-groups, are to be allocated, the total number of flows exceeds the maximum number of flows the processing core 8 is capable of processing. Accordingly, the sub-group A is divided in this case. That is, the flow group is re-divided despite the fact that there is another processing core that has a capacity to accommodate the flows of the sub-group A and that there is a sufficient margin in the overall performance.

Re-division of a flow group raises concerns about a decrease in resources of the allocation control core 11 and the allocation core 12 due to an increase in occurrence of a dividing process and an increased number of stages of the tables.

In contrast, if the processing core 8 is selected as a processing core to which the sub-group A (including approximately 150 flows) obtained by division into eight sub-groups is to be allocated, the total number of flows does not exceed the maximum number of flows the processing core 8 is capable of processing. Thus, the flows of the sub-group A can be registered in the processing core 8. This indicates that increasing the number of sub-groups created by dividing a flow group, that is, increasing the hash extension width may decrease occurrence of re-division of the flow group.

M-digit extended allocation tables each have $2^{(M-N)}$ rows, and the size of M-digit extended application tables increases in proportion to the hash extension width. Accordingly, an increase in the hash extension width raises concerns about an increased memory usage for retaining M-digit extended allocation tables and an increased search time.

For such reasons, the hash extension width is desirably set to a value capable of minimizing both occurrence of re-division of a flow group and an harmful effect of the increase in the size of the M-digit extended allocation tables. Accordingly, in the second embodiment, the hash extension width is decided upon taking into account a deviation of flows in respective sub-groups created by division and a deviation of flows in respective processing cores.

Device Configuration in Second Embodiment

In the second embodiment, the hardware configuration and the functional configuration of the packet processing apparatus 1 are substantially the same as those of the first embodiment.

In the second embodiment, the allocation control core 11 decides upon the hash extension width, based on a deviation ($\sigma 1$) of flows registered in respective flow groups in respective M-digit extended allocation tables and a deviation ($\sigma 2$) of flows registered in respective processing cores. Hereinafter, the hash extension width M−N is referred to as X.

The allocation control core 11 uses, as the deviation $\sigma 1$ of flows registered in respective flow groups in respective M-digit extended allocation tables, an average of standard deviations of the numbers of flows registered in respective flow groups in each M-digit extended allocation table. The standard deviation used herein is an absolute value and takes a value in a range from 0 to 1. That is, the deviation $\sigma 1$ takes a value in a range from 0 to 1.

The deviation $\sigma 1$ close to 0 indicates that flows are registered substantially evenly for respective flow groups in each M-digit extended allocation table and that the current hash extension width is appropriate. Accordingly, the allocation control core 11 functions to minimize an increase in the hash extension width X. That is, the allocation control core 11 functions not to make the hash extension width X deviate from the current value.

In contrast, the deviation $\sigma 1$ close to 1 indicates that flows are concentrated in a specific flow group in one or a plurality of M-digit extended allocation tables. In this case, the allocation control core 11 functions to increase the hash extension width X in order to evenly distribute flows of the flow group to be newly divided.

That is, it is determined whether the current hash extension width X is appropriate by calculating the deviation $\sigma 1$ of flows registered in respective flow groups in respective M-digit extended allocation tables. The state in which the deviation $\sigma 1$ is close to 0 is hereinafter expressed that the deviation $\sigma 1$ is small. In addition, the state in which the deviation $\sigma 1$ is close to 1 is hereinafter expressed that the deviation $\sigma 1$ is large.

There may be cases where flows are concentrated in a specific processing core when viewed in terms of processing cores even if flows are evenly distributed when viewed in terms of flow groups. Accordingly, the allocation control core 11 also takes into account the largest value among the numbers of flows registered in respective processing cores and the deviation $\sigma 2$ of flows in the respective processing cores.

If the largest value among the numbers of flows registered in the respective processing cores is close to the upper limit number of flows each processing core is capable of processing, it is highly likely that re-allocation of each of sub-groups created by division triggers re-division (see FIG. 15). In contrast, if the largest value among the numbers of flows registered in the respective processing cores is sufficiently smaller than the upper limit number of flows each processing core is capable of processing, each processing core has a sufficient capacity to accommodate flows and re-division is less likely to occur. The state in which the largest value among the numbers of flows registered in the respective processing cores is close to the upper limit number of flows each processing core is capable of processing is simply expressed that the largest value among the numbers of flows registered in the respective processing cores is large. In addition, the state in which the largest value among the numbers of flows registered in the respective processing cores is sufficiently smaller than the upper limit number of flows each processing core is capable of processing is simply expressed that the largest value among the numbers of flows registered in the respective processing cores is small.

In the second embodiment, the absolute value of the standard deviation of the numbers of flows registered in respective processing cores is used as the deviation σ2 of flows in the respective processing cores. The deviation σ2 of flows in the respective processing cores close to 0 indicates that flows are registered without any concentration in a specific processing core. The deviation σ2 of flows in the respective processing cores close to 1 indicates that flows are registered in respective processing cores unevenly. Hereinafter, the state in which the deviation σ2 of flows in respective processing cores is close to 0 is expressed that the deviation σ2 of flows in respective processing cores is small. In addition, the state in which the deviation σ2 of flows in respective processing cores is close to 1 is expressed that the deviation σ2 of flows in respective processing cores is large.

If the largest value among the numbers of flows registered in respective processing cores is large and the deviation σ2 of flows in the respective processing cores is large, such a situation indicates that flows are concentrated in a specific processing core and the number of flows the processing core is able to further accommodate is small as illustrated in FIG. 15. In this case, re-division of a flow group is likely to occur. Thus, the allocation control core 11 functions to increase the hash extension width X.

If the largest value among the numbers of flows registered in respective processing cores is small and the deviation σ2 of flows in the respective processing cores is also small, such a situation indicates that flows are registered to the respective processing cores evenly and each processing core has a sufficient capacity to accommodate more flows. In this case, the allocation control core 11 determines that the current hash extension width X is sufficient or too large and functions to decrease the hash extension width X.

The allocation control core 11 uses Equation 1 below as an exemplary formula of calculating the hash extension width X that operates as described above.

$$X = D\{1 + m1 * \sigma1 + m2 * \sigma2\} \quad \text{(Equation 1)}$$

$$\sigma2 = \begin{cases} +\sigma2 \begin{pmatrix} S1 \leq \text{the largest value among the numbers} \\ \text{of flows in respective processing cores} \\ \text{AND } S2 \leq \sigma2 \end{pmatrix} \\ 0 \begin{pmatrix} S1 \leq \text{the largest value among the numbers of} \\ \text{flows in respective processing cores AND} \\ \sigma2 < S2 \\ \text{OR} \\ \text{the largest value among the numbers of} \\ \text{flows in respective processing cores} < \\ S1 \text{ AND } S2 \leq \sigma2 \end{pmatrix} \\ -\sigma2 \begin{pmatrix} \text{the largest value among the numbers of} \\ \text{flows in respective processing cores} < \\ S1 \text{ AND } \sigma2 < S2 \end{pmatrix} \end{cases}$$

D: default hash extension width m1: weight coefficient for the deviation of flows in respective flow groups (0≤m1)

m2: weight coefficient for the deviation of flows in respective processing cores (0≤m2)

σ1: deviation of flows in respective flow groups in respective M-digit extended allocation tables (0≤σ1≤1)

σ2: deviation of flows in respective processing cores (0≤σ2≤1)

S1: threshold for the number of flows in respective processing cores

S2: threshold for the standard deviation of the numbers of flows in respective processing cores In Equation 1, D denotes the default value of the hash extension width, and m1 and m2 are weight coefficients. Each of m1 and m2 takes a value greater than or equal to 0 and is set to a given value by an administrator. For example, the hash extension width X can be calculated without taking into account either the deviation σ1 of flows in respective flow groups in respective M-digit extended allocation tables or the deviation σ2 of flows in respective processing cores by setting either m1 or m2 to 0.

If the largest value among the numbers of flows in the respective processing cores is greater than or equal to the threshold S1, the deviation σ2 takes a positive value. Specifically, when the largest value among the numbers of flows in the respective processing cores is greater than or equal to the threshold S1, it is determined that re-division is highly likely to occur. Accordingly, the hash extension width X is increased.

If the largest value among the numbers of flows in respective processing cores is less than the threshold S1, the deviation σ2 takes a negative value. Specifically, the largest value among the numbers of flows in the respective processing cores is less than S1, it is determined that re-division is less likely to occur. Accordingly, the hash extension width X is decreased.

In the case of S1≤the largest value among the numbers of flows in the respective processing cores ("+") and σ2<S2 and in the case of the largest value among the numbers of flows in the respective processing cores<S1 ("−") and S2≤σ2, the deviation σ2 is multiplied by 0. In the case of S1≤the largest value among the numbers of flows in the respective processing cores ("+") and σ2<S2, it is determined that flows are registered without any concentration in a number close to the upper limit number of flows each processing core is capable of processing, and every processing core has a little capacity. In the case of the largest value among the numbers of flows in the respective processing cores<S1 ("−") and S2≤σ2, flows are concentrated in a specific processing core but the processing core has a sufficient capacity. In these cases, the influence of concentration of flows in the processing core on re-division is small.

Note that the formula of calculating the hash extension width X is not limited to the above-described one. For example, even in the case of S1≤the largest value among the numbers of flows in the respective processing cores ("+") and σ2<S2 and in the case of the largest value among the numbers of flows in the respective processing cores<S1 ("−") and S2≤σ2, the deviation σ2 is not necessarily multiplied by 0.

Flow of Process

Figure 16:
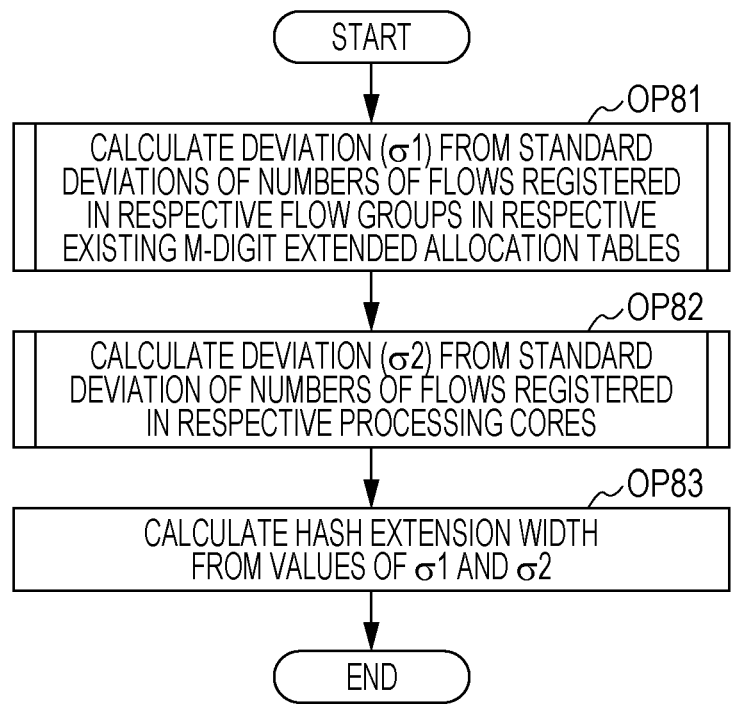
FIG. 16 is an exemplary flowchart of a process of calculating a hash extension width.

FIG. 16 is an exemplary flowchart of a process of calculating the hash extension width. The process illustrated in FIG. 16 is started before or after a flow group is divided, for example. More specifically, the process illustrated in FIG. 16 is started before or after the processing of OP10 in FIG. 12A is performed, for example.

In OP81, the allocation control core 11 calculates the deviation σ1 from standard deviations of the numbers of flows registered in respective flow groups in respective existing M-digit extended allocation tables. Details of the processing in OP81 will be described later. The process then proceeds to OP82.

In OP82, the allocation control core 11 calculates the deviation σ2 from the standard deviation of the numbers of flows registered in the respective processing cores. Details of the processing in OP82 will be described later. The process then proceeds to OP83.

In OP83, the allocation control core 11 calculates the hash extension width X from the deviations σ1 and σ2. In OP83, for example, Equation 1 is used. Then, the process illustrated in FIG. 16 ends.

In the case where the process of calculating the hash extension width is performed before a flow group is divided, an M-digit extended allocation table is created (OP33 in FIG. 13) by using the hash extension width calculated in OP83. In the case where the process of calculating the hash extension width is performed after a flow group is divided, the hash extension width calculated in OP83 is stored in the memory and is used when a flow group is divided thereafter.

Note that the process of calculating the deviation σ1 in OP81 and the process of calculating the deviation σ2 in OP82 may be performed in the opposite order.

Figure 17:
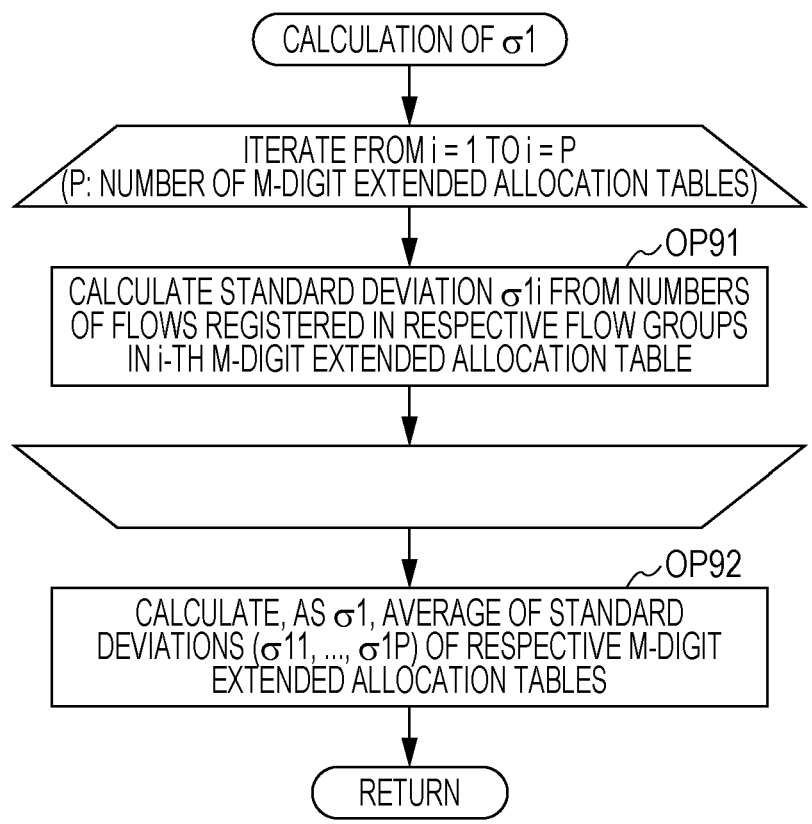
FIG. 17 is an exemplary flowchart of a process of calculating a deviation σ1.

FIG. 17 is an exemplary flowchart of the process of calculating the deviation σ1. A variable i is a pointer indicating one of existing M-digit extended allocation tables. The variable i is initially set to 1 and takes a value in a range from 1 to P, where P denotes the number of M-digit extended allocation tables.

In OP91, the allocation control core 11 calculates the standard deviation σ1$i$ from the numbers of flows in respective flow groups each identified by the upper M-digit hash value in an i-th M-digit extended allocation table. Note that the standard deviation σ1$i$ is calculated as an absolute value. The processing in OP91 is repeatedly performed until the variable i becomes equal to P. After the standard deviation σ1$i$ is calculated for all the M-digit extended allocation tables, the process proceeds to OP92.

In OP92, the allocation control core 11 calculates, as the deviation σ1, an average of the standard deviations σ11, σ12, . . . , σ1P that have been calculated for the respective M-digit extended allocation tables. The process illustrated in FIG. 17 then returns to the process illustrated in FIG. 16.

In the case where the process of calculating the hash extension width illustrated in FIG. 16 is performed before a flow group is divided, no M-digit extended allocation table is present when a flow group is divided for the first time, and thus the deviation σ1 is equal to 0. In the case where the process of calculating the hash extension width illustrated in FIG. 16 is performed after a flow group has been divided for the first time, the standard deviation σ11 of a single M-digit extended allocation table created by the division serves as the deviation σ1.

Figure 18:
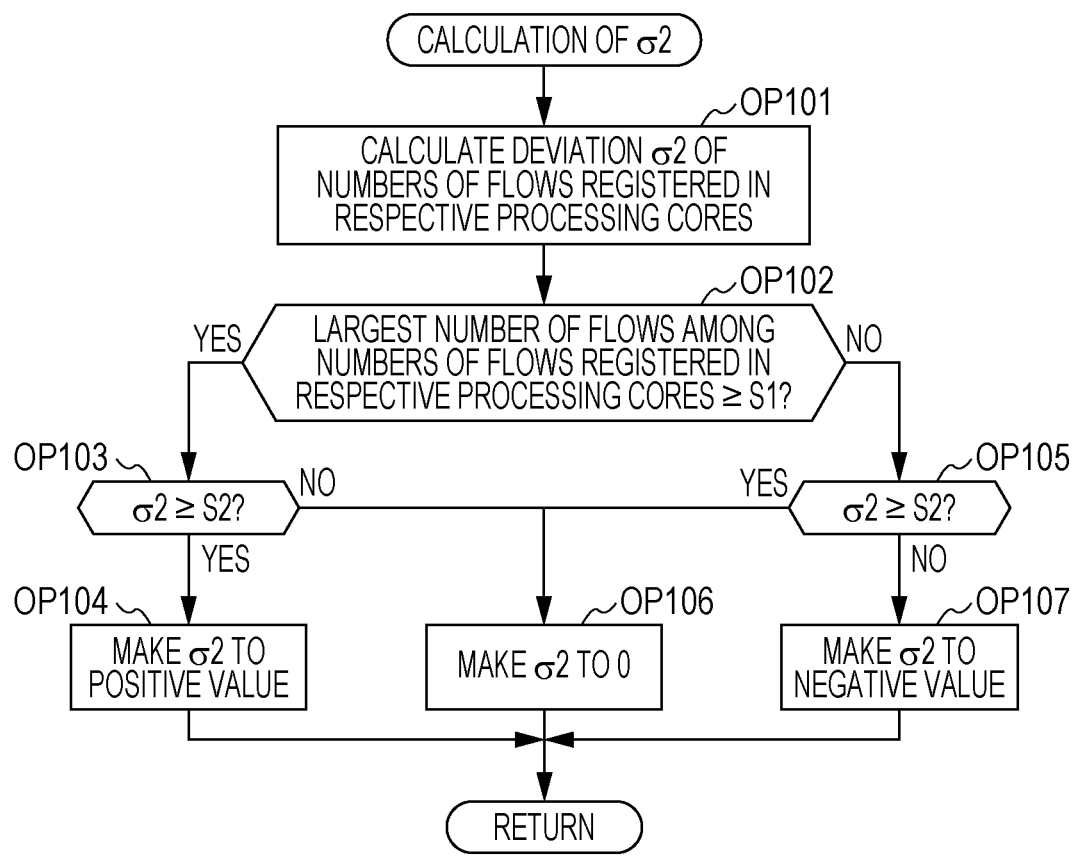
FIG. 18 is an exemplary flowchart of a process of calculating a deviation σ2.

FIG. 18 is an exemplary flowchart of the process of calculating the deviation σ2. In OP101, the allocation control core 11 calculates, as the deviation σ2, the standard deviation of the numbers of flows registered in the respective processing cores, by referring to the processing core management table. At this point, the deviation σ2 is an absolute value of the standard deviation of the numbers of flows registered in the respective processing cores. The process then proceeds to OP102.

In OP102, the allocation control core 11 determines whether the largest value among the numbers of flows registered in the respective processing cores is greater than or equal to the threshold S1. This determination is performed based on the processing core management table.

If the largest value among the numbers of flows registered in the respective processing cores is greater than or equal to the threshold S1 (OP102: YES), the process proceeds to OP103. If the largest value among the numbers of flows registered in the respective processing cores is less than the threshold S1 (OP102: NO), the process proceeds to OP105.

In OP103, the allocation control core 11 determines whether the deviation σ2 is greater than or equal to the threshold S2. If the deviation σ2 is greater than or equal to the threshold S2 (OP103: YES), the process proceeds to OP104. If the deviation σ2 is less than the threshold S2 (OP103: NO), the process proceeds to OP106.

In OP104, the allocation control core 11 sets the deviation σ2 to have a positive value because the largest value among the numbers of flows registered in the respective processing cores is greater than or equal to the threshold S1 and the deviation σ2 is greater than or equal to the threshold S2. In this way, the deviation σ2 functions to increase the hash extension width. The process illustrated in FIG. 18 then returns to the process illustrated in FIG. 16.

In OP105, the allocation control core 11 determines whether the deviation σ2 is greater than or equal to the threshold S2. If the deviation σ2 is greater than or equal to the threshold S2 (OP105: YES), the process proceeds to OP106. If the deviation σ2 is less than the threshold S2 (OP105: NO), the process proceeds to OP107.

In OP106, the allocation control core 11 sets the deviation σ2 to 0 because the largest value among the numbers of flows registered in the respective processing cores is greater than or equal to the threshold S1 and the deviation σ2 is less than the threshold S2 or the largest value among the numbers of flows registered in the respective processing cores is less than the threshold S1 and the deviation σ2 is greater than or equal to the threshold S2. The process illustrated in FIG. 18 then returns to the process illustrated in FIG. 16.

In OP107, the allocation control core 11 sets the deviation σ2 to have a negative value because the largest value among the numbers of flows registered in the respective processing cores is less than the threshold S1 and the deviation σ2 is less than the threshold S2. In this way, the deviation σ2 functions to decrease the hash extension width. The process illustrated in FIG. 18 then returns to the process illustrated in FIG. 16.

Effects of Second Embodiment

In the second embodiment, the allocation control core 11 calculates the hash extension width, based on the deviation σ1 of flows registered in respective flow groups in respective M-digit extended allocation tables and the deviation σ2 of flows registered in the respective processing cores. In this way, the allocation control core 11 can suppress occurrence of re-division for further diving sub-groups created by dividing a flow group when the flow group is divided into the sub-groups and can suppress resources from being used unnecessarily because the size of a new M-digit extended allocation table becomes too large.

In the second embodiment, the deviation σ1 of flows registered in respective flow groups in respective M-digit extended allocation tables is calculated based on the standard deviations of the numbers of flows registered in the respective flow groups in the respective M-digit extended allocation tables. In addition, the deviation σ2 of flows registered in the respective processing cores is calculated based on the standard deviation of the numbers of flows registered in the respective processing cores. However, the methods for calculating the deviations σ1 and σ2 are not limited to these methods, and the deviations σ1 and σ2 may be respectively calculated based on a variance of the numbers of flows registered in the respective flow groups in the respective M-digit extended allocation tables and a variance of the numbers of flows registered in the respective processing cores. The deviations σ1 and σ2 are not limited to indices such as the standard deviations or variances as long as they indicate the degree of deviation of flows.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to execute a process including:
selecting, from among a plurality of data processing sections that subject data blocks to a predetermined process, a data processing section to which one of first data block groups is allocated, wherein the data blocks are classified into a plurality of the first data block groups based on first identification information regarding the respective data blocks,
dividing, when a workload placed on the selected data processing section exceeds a first threshold, the one of the first data block groups allocated to the selected data processing section into a plurality of second data block groups based on second identification information regarding the respective data blocks, and selecting, from among the plurality of data processing sections, data processing sections to which the plurality of second data block groups are allocated,
acquiring the first identification information from flow information on flows to which the data blocks pertain,
acquiring the second identification information from information of the flow information which is different from the first identification information,
calculating a hash value from the flow information,
acquiring an N-diqit number (N: positive integer) from the hash value, as the first identification information, and
acquiring an M-diqit number (N <M≤the number of all the digits of the hash value) from the hash value, as the second identification information, the M-diqit number containing the N-digit number.

2. The information processing device according to claim 1, wherein the process further includes:
re-creating the one of the first data block groups by aggregating the second data block groups when a total workload for the plurality of second data block groups becomes less than a second threshold and lower than a processing capacity of one of the plurality of data processing sections.

3. The information processing device according to claim 1, wherein the process further includes:
storing, in a first storage section, a relationship between the first identification information and the data processing section to which the first data block group is allocated, and
storing, when creating the plurality of second data block groups from the one of the first data block groups, in a second storage section, a relationship between the second identification information and the data processing sections to which the plurality of second data block groups are allocated, the second storage section being independent of the first storage section.

4. The information processing device according to claim 1, wherein the process further includes:
selecting, when receiving an entry of the flow information from a controller, the data processing section to which the one of the first data block groups is allocated, the controller being configured to acquire the flow information from a control data block transmitted before an arrival of the data blocks.

5. The information processing device according to claim 1, wherein the process further includes:
deciding upon a value of M indicating the M-digit number of the hash value that is to be acquired and used as the second identification information when a new first data block group is divided into second data block groups, based on a first deviation of flows included in the respective second data blocks that have been created by dividing at least one first data block group and a second deviation of flows that have been allocated to the respective data processing sections.

6. The information processing device according to claim 5, wherein the process further includes:
acquiring the first deviation, based on standard deviations of the numbers of flows included in the respective second data block groups that have been created by dividing the at least one first data block group, and
acquiring the second deviation, based on a standard deviation of the numbers of flows that have been allocated to the respective data processing sections.

7. The information processing device according to claim 6, wherein the deciding upon the value of M includes multiplying an initial value of M with a sum of 1(one), a product of the first deviation and a first weight coefficient, and a product of the second deviation and a second weight coefficient.

8. The information processing device according to claim 7, wherein the process further includes:
setting, when the largest value among the numbers of flows that have been allocated to the respective data processing sections is greater than or equal to a third threshold and the standard deviation of the numbers of flows that have been allocated to the respective data processing sections is greater than or equal to a fourth threshold, the second deviation to have a positive value of the standard deviation,
setting, when the largest value among the numbers of flows that have been allocated to the respective data processing sections is less than the third threshold and the standard deviation of the numbers of flows that have been allocated to the respective data processing sections is less than the fourth threshold, the second deviation to have a negative value of the standard deviation, and setting the second deviation to 0 when the largest value among the numbers of flows that have been allocated to the respective data processing sections is greater than or equal to the third threshold and the standard deviation of the numbers of flows that have been allocated to the respective data processing sections is less than fourth threshold or when the largest value among the numbers of flows that have been allocated to the respective data processing sections is less than the third threshold and the standard deviation of the numbers of flows that have been allocated to the respective data processing sections is greater than or equal to the fourth threshold.

9. An information processing method comprising:

selecting, from among a plurality of data processing sections that subject data blocks to a predetermined process, a data processing section to which one of first data block groups is allocated, wherein the data blocks are classified into a plurality of the first data block groups based on first identification information regarding the respective data blocks; and dividing, when a workload placed on the selected data processing section exceeds a first threshold, the one of the first data block groups allocated to the selected data processing section into a plurality of second data block groups based on second identification information regarding the respective data blocks, and selecting, from among the plurality of data processing sections, data processing sections to which the plurality of second data block groups are allocated;

acquiring the first identification information from flow information on flows to which the data blocks pertain;

acquiring the second identification information from information of the flow information which is different from the first identification information;

calculating a hash value from the flow information;

acquiring an N-digit number (N: positive integer) from the hash value, as the first identification information; and acquiring an M-digit number (N <M≤the number of all the digits of the hash value) from the hash value, as the second identification information, the M-digit number containing the N-digit number, wherein the selecting and the dividing are performed by a processor.

* * * * *